US012625462B2

(12) United States Patent
Taguchi et al.

(10) Patent No.: US 12,625,462 B2
(45) Date of Patent: May 12, 2026

(54) MOVABLE TONER CARTRIDGE HANDLE AND IMAGE FORMING APPARATUS

(71) Applicant: BROTHER KOGYO KABUSHIKI KAISHA, Nagoya (JP)

(72) Inventors: Kazuna Taguchi, Nagoya (JP); Shougo Sato, Seto (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/889,883

(22) Filed: Sep. 19, 2024

(65) Prior Publication Data

US 2025/0013193 A1 Jan. 9, 2025

Related U.S. Application Data

(63) Continuation of application No. 18/180,323, filed on Mar. 8, 2023, now Pat. No. 12,147,189, which is a (Continued)

(30) Foreign Application Priority Data

Sep. 2, 2019 (JP) ................................ 2019-159905

(51) Int. Cl.
*G03G 21/18* (2006.01)
*G03G 15/08* (2006.01)
(Continued)

(52) U.S. Cl.
CPC ..... *G03G 21/1842* (2013.01); *G03G 15/0896* (2013.01); *G03G 21/007* (2013.01); (Continued)

(58) Field of Classification Search
CPC ........... G03G 15/0121; G03G 15/0877; G03G 15/0879; G03G 15/0881; G03G 15/0886; (Continued)

(56) References Cited

U.S. PATENT DOCUMENTS

2004/0179859 A1 9/2004 Ishii
2004/0190932 A1 9/2004 Ishii
(Continued)

FOREIGN PATENT DOCUMENTS

JP 2000-132053 A 5/2000
JP 2002-207408 A 7/2002
(Continued)

OTHER PUBLICATIONS

Office Action (Notice of Reasons for Refusal) issued in corresponding Japanese Patent Application No. 2019-159905, Apr. 4, 2023.

*Primary Examiner* — Joseph S Wong
(74) *Attorney, Agent, or Firm* — Merchant & Gould P.C.

(57) ABSTRACT

An image forming device, including: a housing; a drawer movable between an inside position at which the drawer is located inside the housing and an outside position at which the drawer is located outside the housing; a drum cartridge including a photoconductive drum and a developer roller and mountable on the drawer; a toner cartridge storing toner to be supplied to the developer roller and mountable on the drawer, wherein the drawer includes a first guide that guides the toner cartridge in mounting the toner cartridge on the drawer, and wherein the drum cartridge includes a second guide connected to the first guide in a state in which the drum cartridge is mounted on the drawer, the second guide being configured to guide the toner cartridge in mounting the toner cartridge on the drawer in the state in which the drum cartridge is mounted on the drawer.

10 Claims, 16 Drawing Sheets

Related U.S. Application Data continuation of application No. 17/881,716, filed on Aug. 5, 2022, now Pat. No. 11,656,575, which is a continuation of application No. 17/518,965, filed on Nov. 4, 2021, now Pat. No. 11,487,241, which is a continuation of application No. 17/003,167, filed on Aug. 26, 2020, now Pat. No. 11,199,809.

(51) Int. Cl.
*G03G 21/00* (2006.01)
*G03G 21/16* (2006.01)

(52) U.S. Cl.
CPC ..... *G03G 21/1619* (2013.01); *G03G 21/1671* (2013.01); *G03G 21/1676* (2013.01); *G03G 21/1817* (2013.01); *G03G 21/1821* (2013.01); *G03G 21/1839* (2013.01); *G03G 21/1846* (2013.01); *G03G 21/185* (2013.01); *G03G 21/1853* (2013.01); *G03G 2221/1678* (2013.01); *G03G 2221/1684* (2013.01); *G03G 2221/1853* (2013.01); *G03G 2221/1884* (2013.01)

(58) Field of Classification Search
CPC ............. G03G 15/0896; G03G 21/007; G03G 21/1619; G03G 21/1647; G03G 21/1661; G03G 21/1671; G03G 21/1676; G03G 21/18; G03G 21/1803; G03G 21/1814; G03G 21/1817; G03G 21/1821; G03G 21/1825; G03G 21/1832; G03G 21/1842; G03G 21/1839; G03G 21/1846; G03G 21/185; G03G 21/1853; G03G 2221/1678; G03G 2221/1684; G03G 2221/1853; G03G 2221/1884
See application file for complete search history.

(56) References Cited

U.S. PATENT DOCUMENTS

| | | | | |
|---|---|---|---|---|
| 2006/0067734 | A1 | 3/2006 | Igarashi et al. | |
| 2006/0140669 | A1 | 6/2006 | Sato | |
| 2006/0257163 | A1 | 11/2006 | Sato | |
| 2008/0075506 | A1 | 3/2008 | Sato | |
| 2012/0251160 | A1 | 10/2012 | Sato | |
| 2015/0277368 | A1 | 10/2015 | Nishiyama et al. | |
| 2016/0154341 | A1 | 6/2016 | Hamada et al. | |
| 2016/0154374 | A1 | 6/2016 | Hiramatsu et al. | |
| 2016/0231698 | A1 | 8/2016 | Miyoshi et al. | |
| 2016/0259294 | A1 | 9/2016 | Sakamoto et al. | |
| 2017/0176925 | A1* | 6/2017 | Sakakibara ........ | G03G 21/1821 |
| 2017/0219996 | A1 | 8/2017 | Sato et al. | |
| 2017/0285566 | A1 | 10/2017 | Shimizu et al. | |
| 2018/0299823 | A1* | 10/2018 | Uyama .............. | G03G 15/0896 |
| 2019/0011870 | A1* | 1/2019 | Sato ................... | G03G 21/1671 |
| 2019/0072878 | A1 | 3/2019 | Sato | |
| 2019/0072896 | A1 | 3/2019 | Sato | |
| 2019/0121260 | A1 | 4/2019 | Bayubay et al. | |
| 2019/0265642 | A1 | 8/2019 | Sahara | |
| 2019/0384217 | A1 | 12/2019 | Sato | |
| 2021/0063949 | A1 | 3/2021 | Sato et al. | |

FOREIGN PATENT DOCUMENTS

| | | | |
|---|---|---|---|
| JP | 2004-279704 | A | 10/2004 |
| JP | 2004-301944 | A | 10/2004 |
| JP | 2006-58350 | A | 3/2006 |
| JP | 2008-76888 | A | 4/2008 |
| JP | 2011-22616 | A | 2/2011 |
| JP | 2012-215596 | A | 11/2012 |
| JP | 2016-99412 | A | 5/2016 |
| JP | 2016-110097 | A | 6/2016 |
| JP | 2016-110133 | A | 6/2016 |
| JP | 2019-45720 | A | 3/2019 |

* cited by examiner

MOVABLE TONER CARTRIDGE HANDLE AND IMAGE FORMING APPARATUS

CROSS REFERENCE TO RELATED APPLICATION

This application is a continuation of U.S. patent application Ser. No. 18/180,323, filed Mar. 8, 2023, now U.S. Pat. No. 12,147,189, which is a continuation of U.S. patent application Ser. No. 17/881,716, filed Aug. 5, 2022, now U.S. Pat. No. 11,635,729, which is a continuation of U.S. patent application Ser. No. 17/518,965, filed Nov. 4, 2021, now U.S. Pat. No. 11,487,241, which is a continuation of U.S. patent application Ser. No. 17/003,167, filed Aug. 26, 2020, now U.S. Pat. No. 11,199,809, which claims priority from Japanese Patent Application No. 2019-159905, which was filed on Sep. 2, 2019, and which applications are incorporated herein by reference. To the extent appropriate, a claim of priority is made to each of the above disclosed applications.

BACKGROUND

Technical Field

The following disclosure relates to an image forming device.

Description of Related Art

An image forming device conventionally includes a device housing, a drawer, and a process cartridge. The drawer is movable between an inside position at which the drawer is located inside the device housing and an outside position at which the drawer is located outside the device housing. The process cartridge is mountable on the drawer. The process cartridge includes a photoconductive drum and a developer roller. The process cartridge is capable of storing toner.

SUMMARY

The process cartridge of the known image forming device includes the photoconductive drum and the developer roller as described above.

When the amount of the toner remaining in the process cartridge of the known image forming device is reduced, for instance, the entirety of the process cartridge including the photoconductive drum needs to be replaced even though the photoconductive drum need not be replaced. It is thus difficult to achieve cost reduction.

Accordingly, one aspect of the present disclosure is directed to an image forming device including a drawer in which (a) a drum cartridge including a photoconductive drum and a developer roller and (b) a toner cartridge storing toner can be replaced independently of each other.

In one aspect of the present disclosure, an image forming device includes: a housing; a drawer movable between an inside position at which the drawer is located inside the housing and an outside position at which the drawer is located outside the housing; a drum cartridge including a photoconductive drum and a developer roller and mountable on the drawer; a toner cartridge storing toner to be supplied to the developer roller and mountable on the drawer, wherein the drawer includes a first guide that guides the toner cartridge in mounting the toner cartridge on the drawer, and wherein the drum cartridge includes a second guide connected to the first guide in a state in which the drum cartridge is mounted on the drawer, the second guide being configured to guide the toner cartridge in mounting the toner cartridge on the drawer in the state in which the drum cartridge is mounted on the drawer.

BRIEF DESCRIPTION OF THE DRAWINGS

The objects, features, advantages, and technical and industrial significance of the present disclosure will be better understood by reading the following detailed description of an embodiment, when considered in connection with the accompanying drawings, in which.

DETAILED DESCRIPTION OF THE EMBODIMENT

1. Image Forming Device 1

Referring to FIGS. 1-4, there will be explained an image forming device 1 according to one embodiment.

Figure 1:
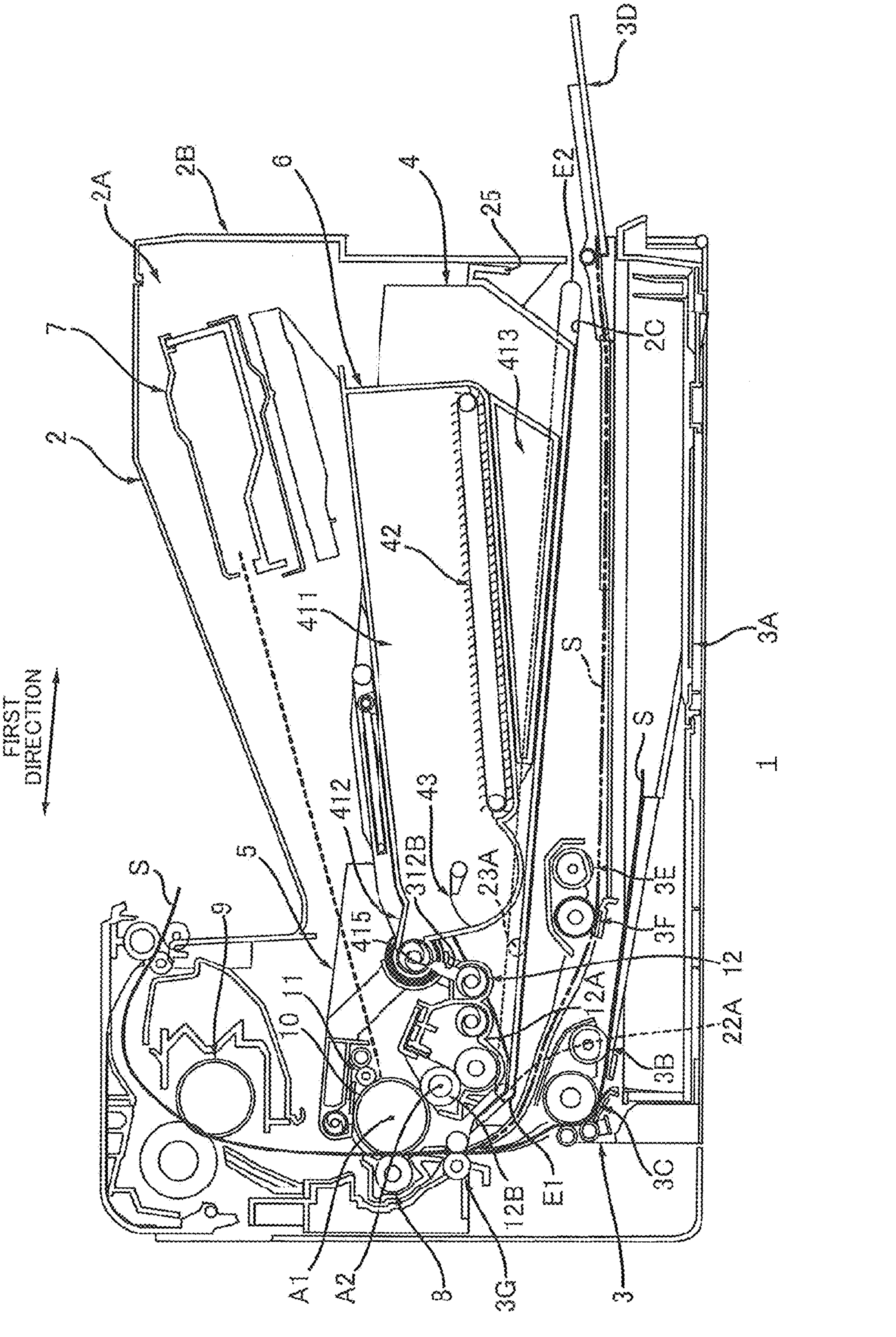
FIG. 1 is a schematic view of an image forming device according to one embodiment.

As shown in FIG. 1, the image forming device 1 includes a housing 2, a sheet supplier 3, a drawer 4, a drum cartridge 5, a toner cartridge 6, an exposure device 7, a transfer roller 8, and a fixing device 9. The image forming device 1 is for monochrome printing. Thus, the image forming device 1 includes one drum cartridge 5 and one toner cartridge 6.

1.1 Housing 2

Figure 2:
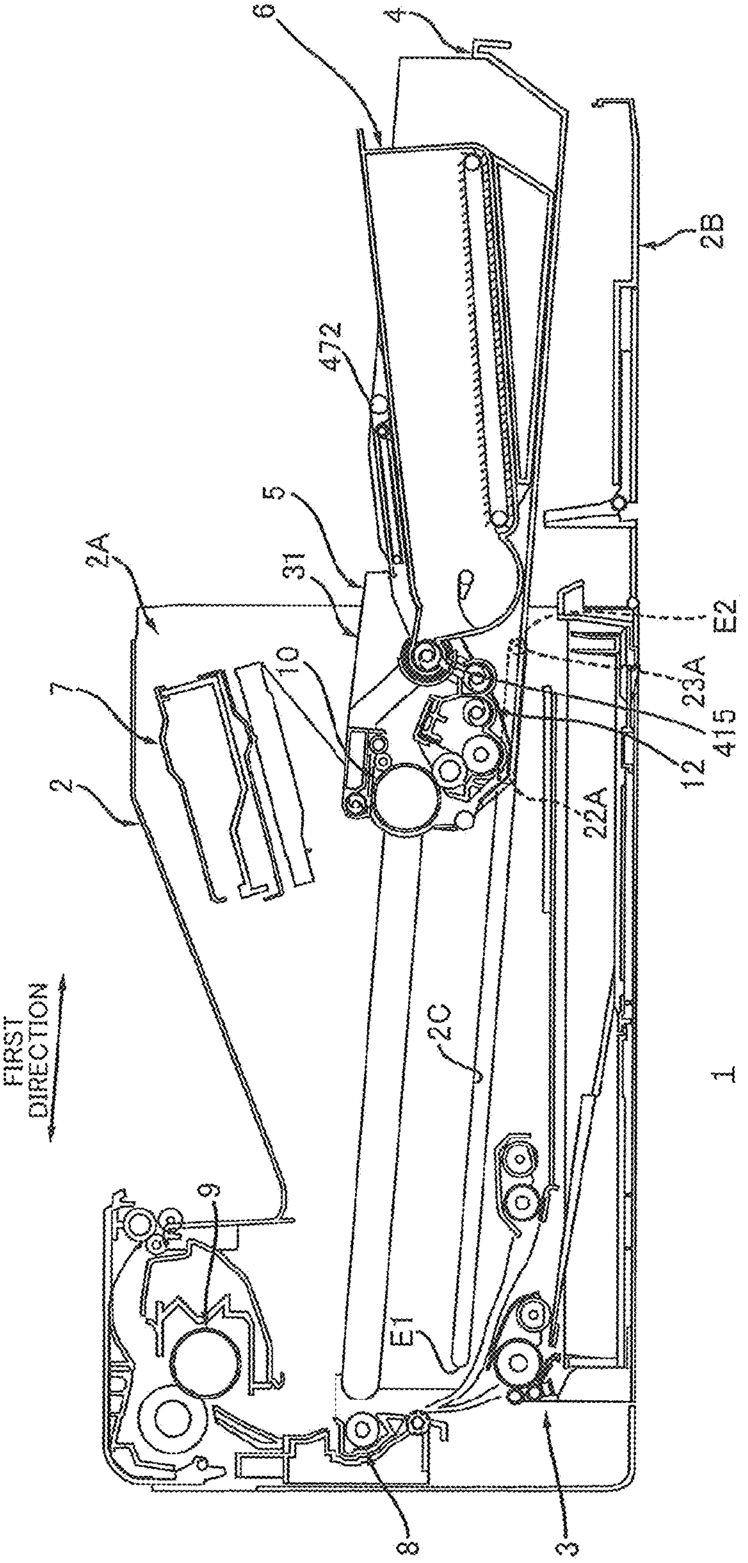
FIG. 2 is an explanatory view for explaining a movement of a drawer, the view illustrating a state in which the drawer of FIG. 1 is located at an outside position.

The housing 2 houses the sheet supplier 3, the drawer 4, the drum cartridge 5, the toner cartridge 6, the exposure device 7, the transfer roller 8, and the fixing device 9. As shown in FIGS. 1 and 2, the housing 2 has an opening 2A. The housing 2 includes a cover 2B.

The cover 2B is movable between a closed position (FIG. 1) and an open position (FIG. 2). In a state in which the cover 2B is located at the closed position, the cover 2B closes the opening 2A. In a state in which the cover 2B is located at the open position, the cover 2B opens the opening 2A.

1.2 Sheet Supplier 3

As shown in FIG. 1, the sheet supplier 3 is capable of supplying sheets S to the photoconductive drum 10. The photoconductive drum 10 will be later explained. The sheet supplier 3 includes a sheet cassette 3A, a pickup roller 3B, a conveying roller 3C, a multi-purpose tray 3D, a pickup roller 3E, a conveying roller 3F, and a conveying roller 3G.

The sheet cassette 3A is capable of storing the sheets S. The pickup roller 3B picks up an uppermost one of the sheets S stacked on the sheet cassette 3A. The pickup roller 3B conveys the picked-up sheet S toward the conveying roller 3C. The conveying roller 3C conveys the sheet S conveyed from the pickup roller 3B toward the conveying roller 3G.

A sheet S can be placed on the multi-purpose tray 3D. The pickup roller 3E picks up the sheet S on the multi-purpose tray 3D and conveys the picked-up sheet S toward the conveying roller 3F. The conveying roller 3F conveys the sheet S from the pickup roller 3E toward the conveying roller 3G.

The conveying roller 3G conveys, toward the photoconductive drum 10, the sheet S from the conveying roller 3C or the sheet S from the conveying roller 3F.

1.3 Drawer 4

As shown in FIGS. 1 and 2, the drawer 4 is movable in a first direction between an inside position (FIG. 1) and an outside position (FIG. 2). The first direction intersects an up-down direction. The drawer 4 inclines downward in a direction directed from the inside position toward the outside position.

Specifically, the housing 2 includes a guide 2C (FIG. 2). The guide 2C is one example of "fourth guide". The guide 2C guides the drawer 4. The guide 2C extends in the first direction. The guide 2C includes a first end portion E1 and a second end portion E2. The second end portion E2 is apart from the first end portion E1 in the first direction. The second end portion E2 is located between the first end portion E1 and the cover 2B in the first direction.

As shown in FIG. 1, the inside position is a position at which a guided portion 22A (FIG. 5) of the drawer 4 engages the first end portion E1 of the guide 2C. The guided portion 22A will be later explained. In a state in which the drawer 4 is located at the inside position, the entirety of the drawer 4 is located inside the housing 2 . . . . As shown in FIG. 2, the outside position is a position at which a guided portion 23A (FIG. 5) of the drawer 4 engages the second end portion E2 of the guide 2C. The guided portion 23A will be later explained. In a state in which the drawer 4 is located at the outside position, at least a part of the drawer 4 is located outside the housing 2.

1.4 Drum Cartridge 5

Figure 3:
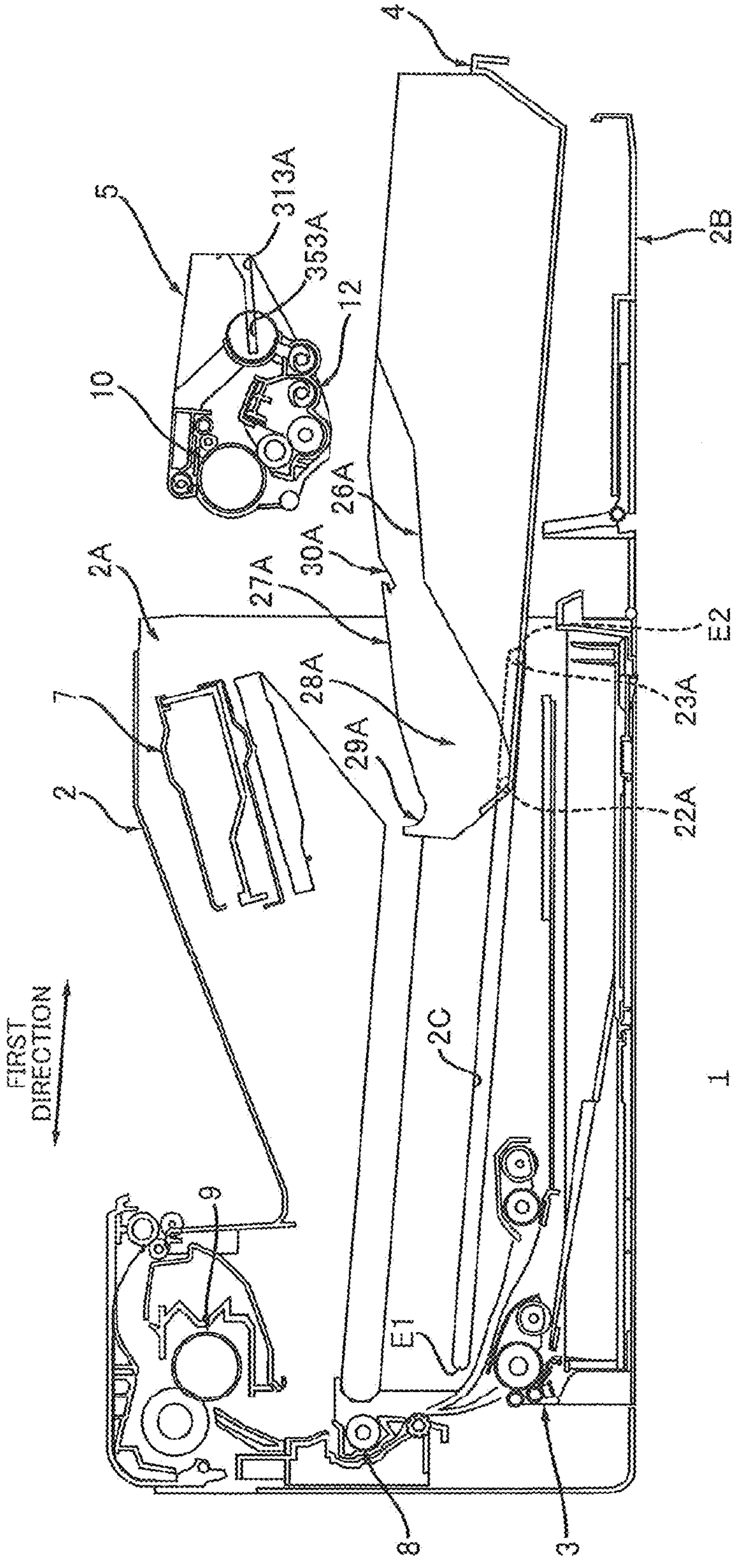
FIG. 3 is an explanatory view for explaining mounting of a drum cartridge on the drawer, the view illustrating a state in which the drum cartridge and a toner cartridge are detached from the drawer of FIG. 2.
Figure 4:
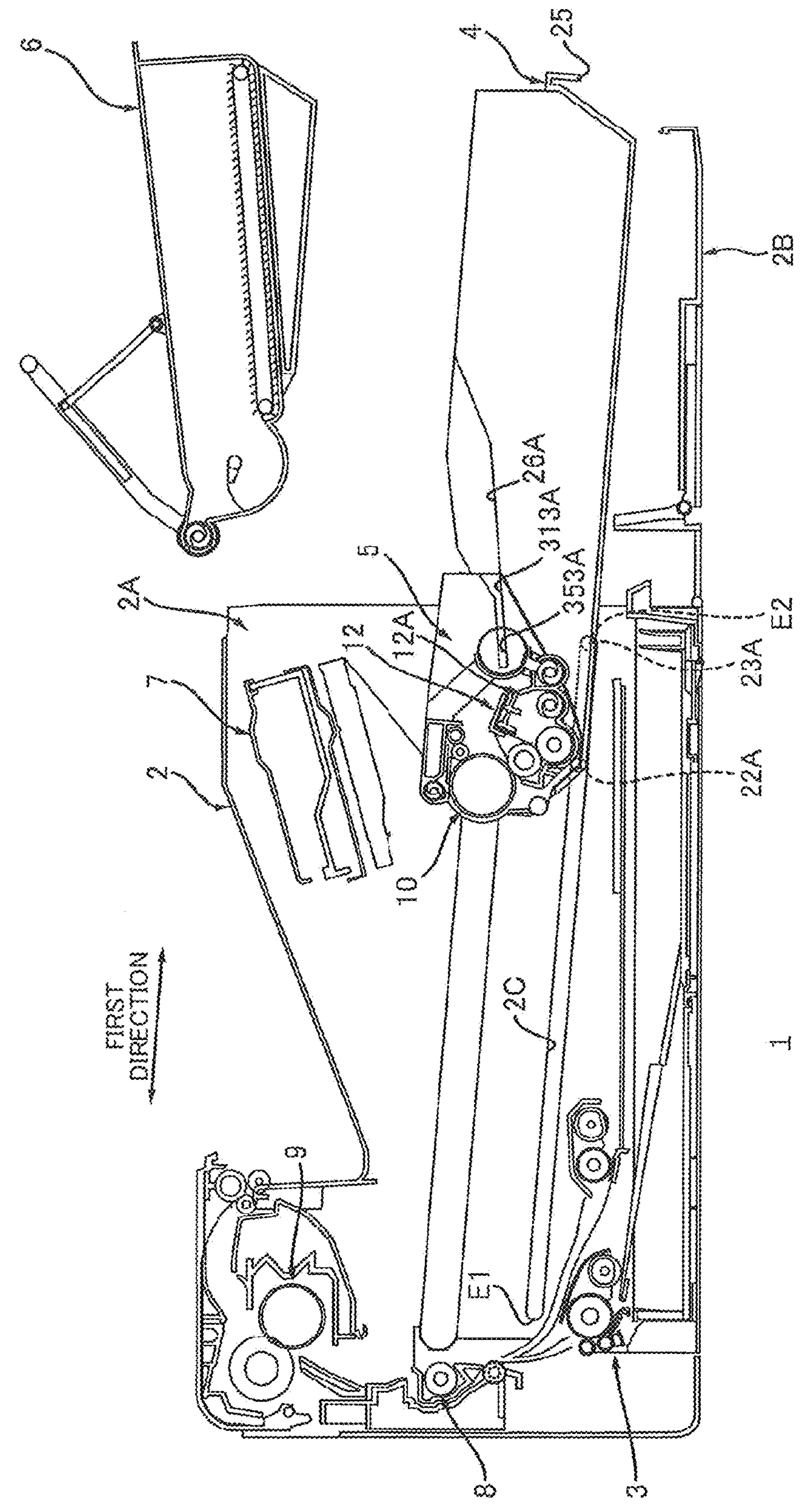
FIG. 4 is an explanatory view for explaining mounting of the toner cartridge on the drawer, the view illustrating a state in which the drum cartridge is mounted on the drawer of FIG. 3.

As shown in FIGS. 3 and 4, the drum cartridge 5 is mountable on the drawer 4 in the state in which the drawer 4 is located at the outside position. As shown in FIG. 4, at least a part of the drum cartridge 5 is located inside the housing 2 in a state in which the drum cartridge 5 is mounted on the drawer 4 and the drawer 4 is located at the outside position. As shown in FIG. 1, the drum cartridge 5 includes a photoconductive drum 10, a charging roller 11, and a developer device 12.

The photoconductive drum 10 is rotatable about an axis A1 that extends in a second direction. The second direction intersects the first direction and the up-down direction. Preferably, the second direction is orthogonal to the first direction and the up-down direction. The photoconductive drum 10 extends in the second direction and has a cylindrical shape. The photoconductive drum 10 is located inside the housing 2 in the state in which the drum cartridge 5 is mounted on the drawer 4 and the drawer 4 is located at the outside position (FIG. 2).

The charging roller 11 causes the surface of the photoconductive drum 10 to be charged. The charging roller 11 is in contact with the surface of the photoconductive drum 10. The drum cartridge 5 may include a scorotron charging device in place of the charging roller 11.

The developer device 12 is capable of supplying the toner to the photoconductive drum 10. Specifically, the developer device 12 includes a developer housing 12A and a developer roller 12B. That is, the drum cartridge 5 includes the developer housing 12A and the developer roller 12B.

The developer housing 12A stores the toner to be supplied to the photoconductive drum 10. The developer housing 12A supports the developer roller 12B. The developer housing 12A is located inside the housing 2 in the state in which the drum cartridge 5 is mounted on the drawer 4 and the drawer 4 is located at the outside position (FIG. 4).

The developer roller 12B is rotatable about an axis A2 that extends in the second direction. The developer roller 12B is in contact with the photoconductive drum 10. The developer roller 12B is capable of supplying the toner in the developer housing 12A to the photoconductive drum 10.

1.5 Toner Cartridge 6

The toner cartridge 6 stores the toner to be supplied to the developer device 12. In other words, the toner cartridge 6 stores the toner to be supplied to the developer roller 12B. As shown in FIGS. 2 and 4, the toner cartridge 6 is mountable on the drawer 4 in the state in which the drawer 4 is located at the outside position. Specifically, the toner cartridge 6 is mountable on the drawer 4 in the state in which the drawer 4 is located at the outside position and the drum cartridge 5 is mounted on the drawer 4.

1.6 Exposure Device 7

As shown in FIG. 1, the exposure device 7 is capable of exposing the surface of the photoconductive drum 10 in a state in which the drum cartridge 5 and the toner cartridge 6 are mounted on the drawer 4 and the drawer 4 is located at the inside position. Specifically, the exposure device 7 is a laser scanning unit.

The exposure device 7 exposes the surface of the photoconductive drum 10 in the state in which the surface of the photoconductive drum 10 is charged by the charging roller 11, so that a latent image is formed on the surface of the photoconductive drum 10. The developer device 12 supplies the toner onto the surface of the photoconductive drum 10 in the state in which the latent image is formed on the surface of the photoconductive drum 10, so that a toner image is formed on the surface of the photoconductive drum 10.

1.7 Transfer Roller 8

The transfer roller 8 is in contact with the photoconductive drum 10 in the state in which the drawer 4, on which the drum cartridge 5 is mounted, is located at the inside position. The sheet S conveyed by the conveying roller 3G passes between the transfer roller 8 and the photoconductive drum 10. In this instance, the transfer roller 8 transfers, onto the sheet S, the toner image formed on the surface of the photoconductive drum 10.

1.8 Fixing Device 9

The fixing device 9 heats and pressurizes the sheet S onto which the toner image has been transferred, so as to fix the toner image on the sheet S. The sheet S that has passed the fixing device 9 is discharged onto an upper surface of the housing 2.

2. Details of Drawer 4

Figure 5:
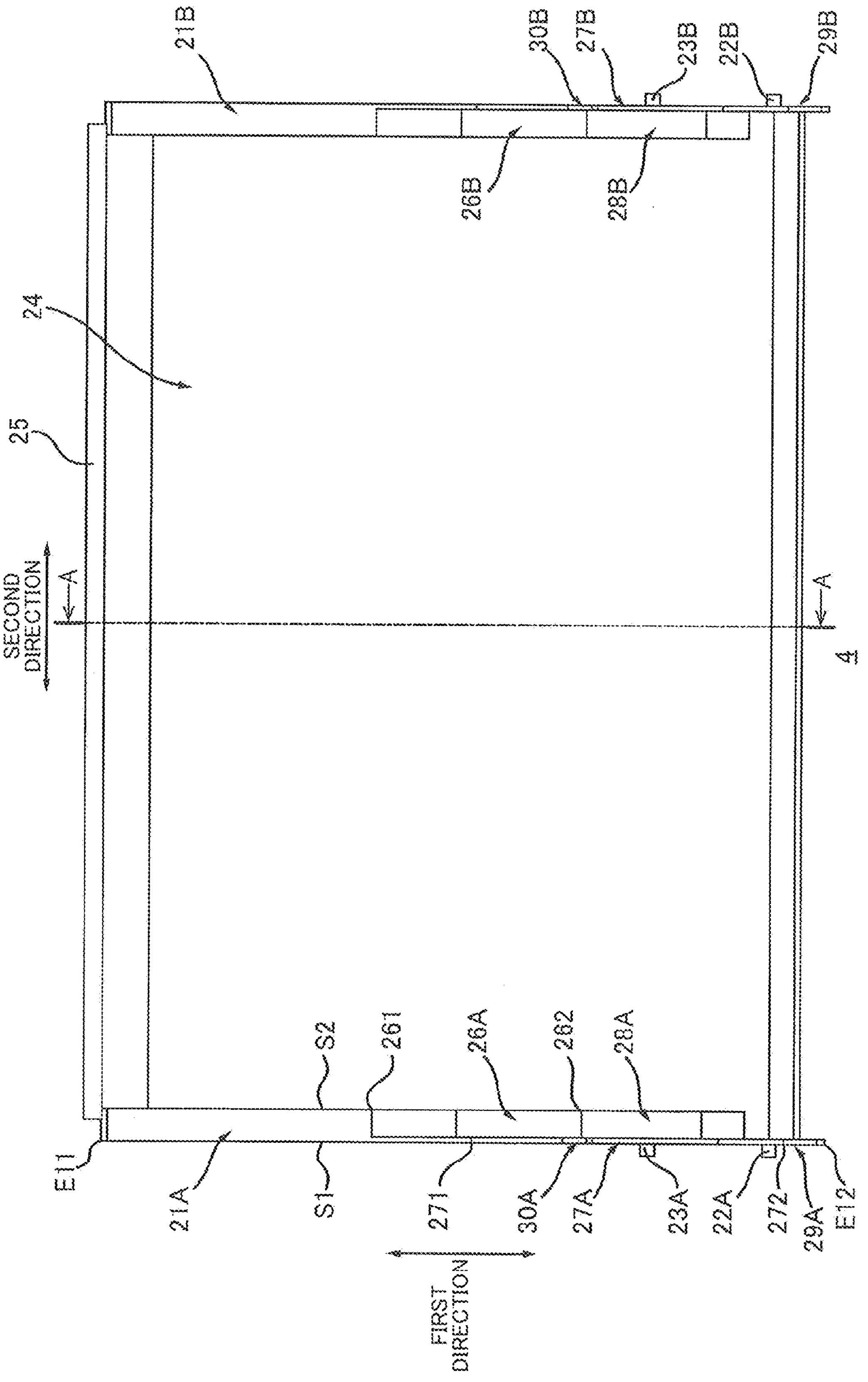
FIG. 5 is a plan view of the drawer of FIG. 1.
Figure 6:
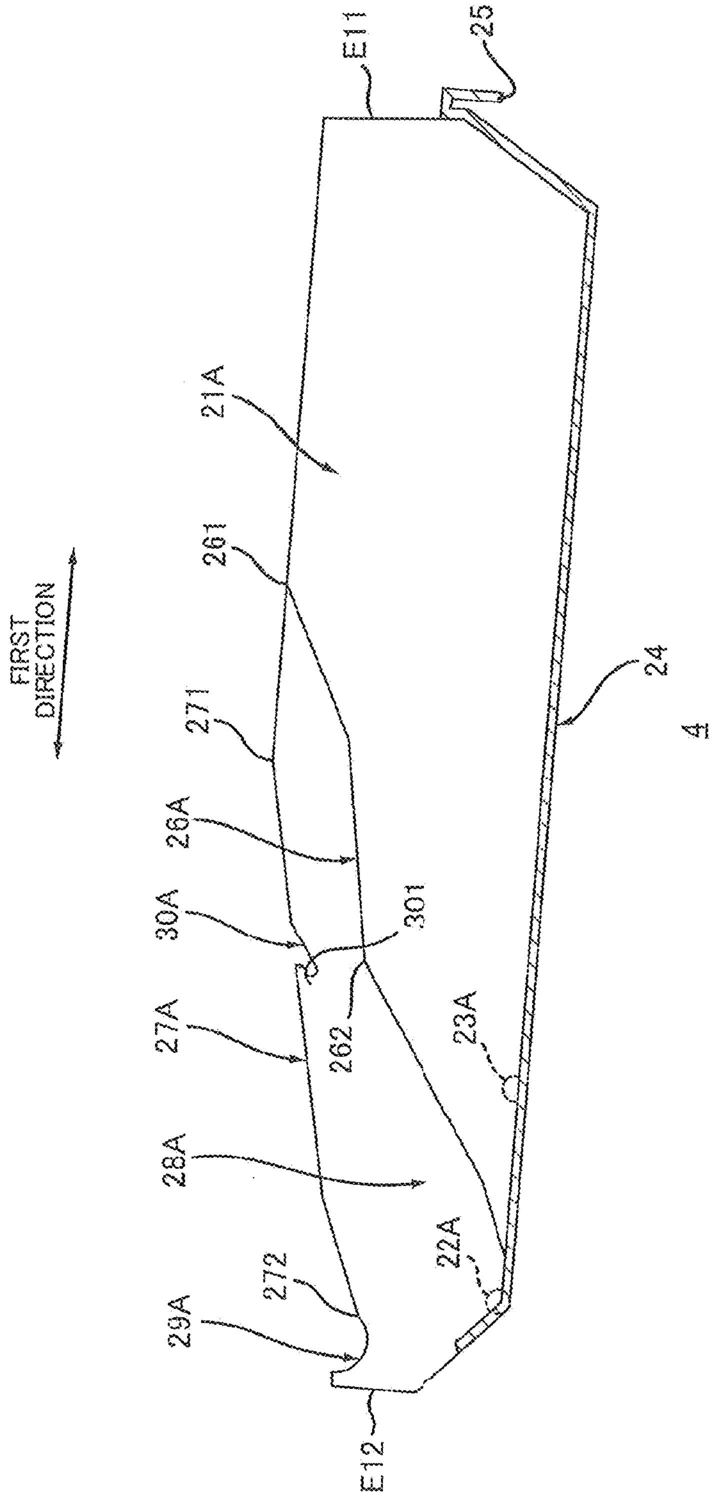
FIG. 6 is a cross-sectional view of the drawer taken along line A-A in FIG. 5.

Referring next to FIGS. 5 and 6, the drawer 4 will be explained.

As shown in FIG. 5, the drawer 4 is shaped like a tray. The drawer 4 extends in the first direction and the second direction. The drawer 4 includes a first end portion in the second direction and a second end portion that is apart from the first end portion in the second direction. The drawer 4 includes side plates 21A, 21B, the guided portions 22A, 23A, guided portions 22B, 23B, a bottom plate 24, and a drawer grip 25.

2.1 Side Plate 21A

The side plate 21A is located at the first end portion of the drawer 4 in the second direction. The side plate 21A extends in the first direction. The side plate 21A includes a first end portion E11 and a second end portion E12 in the first direction. The second end portion E12 is apart from the first end portion E11 in the first direction. The side plate 21A includes a first surface S1 and a second surface S2 in the second direction. The second surface S2 is located between the first surface S1 and the side plate 21B in the second direction.

As shown in FIG. 5 and FIG. 6, the side plate 21A includes a guide 26A (as one example of "first guide"), a guide 27A (as one example of "third guide"), a receiving portion 28A, a receiving portion 29A, and a locking portion 30A. That is, the drawer 4 includes the guide 26A, the guide 27A, and the locking portion 30A.

2.1.1 Guide 26A

As shown in FIG. 5, the guide 26A is provided on the second surface S2 of the side plate 21A.

As shown in FIG. 6, the guide 26A extends in the first direction. The guide 26A inclines with respect to the first direction. The guide 26A gets closer to the bottom plate 24 as the guide 26A gets closer to the second end portion E12 of the side plate 21A. The guide 26A includes a first end portion 261 and a second end portion 262. The first end portion 261 is located between the first end portion E11 and the second end portion E12 of the side plate 21A in the first direction. The second end portion 262 is located between the first end portion 261 and the second end portion E12 of the side plate 21A in the first direction. The guide 26A guides a side plate 311A (FIG. 8A) of the drum cartridge 5 in mounting the drum cartridge 5 on the drawer 4 (FIGS. 3 and 4). The side plate 311A will be later explained. The guide 26A guides a guided portion 46A (FIG. 11) of the toner cartridge 6 in mounting the toner cartridge 6 on the drawer 4 (FIGS. 2 and 4). The guided portion 46A (as one example of "protrusion") will be later explained.

2.1.2 Guide 27A

As shown in FIG. 6, the guide 27A is provided at an edge of the side plate 21A. The guide 27A may be provided on the second surface S2 of the side plate 21A. The guide 27A extends in the first direction and inclines with respect to the first direction. The guide 27A gets closer to the bottom plate 24 as the guide 27A gets closer to the second end portion E12. The guide 27A includes a first end portion 271 and a second end portion 272. The first end portion 271 is located between the first end portion E11 and the second end portion E12 of the side plate 21A in the first direction. The first end portion 271 is located between the first end portion 261 and the second end portion 262 of the guide 26A in the first direction. The second end portion 272 is located between the first end portion 271 and the second end portion E12 of the side plate 21A in the first direction. The second end portion 272 is located between the second end portion 262 of the guide 26A and the second end portion E12 of the side plate 21A in the first direction. The guide 27A guides a guided portion 32A (FIG. 7) of the drum cartridge 5 in mounting the drum cartridge 5 on the drawer 4 (FIGS. 3 and 4). According to this arrangement, the guide 27A guides the photoconductive drum 10 via the guided portion 32A in mounting the drum cartridge 5 on the drawer 4. The guided portion 32A will be later explained.

As shown in FIG. 5, the guide 27A is located opposite to the side plate 21B with respect to the guide 26A in the second direction. In other words, the guide 26A is located between the guide 27A and the side plate 21B in the second direction. The guide 27A is located between the guide 26A and the guided portion 22A in the second direction.

2.1.3 Receiving Portion 28A

As shown in FIG. 6, the receiving portion 28A is located between the guide 26A and the second end portion E12 of the side plate 21A in the first direction. In the state in which the drum cartridge 5 is mounted on the drawer 4 (FIG. 4), the receiving portion 28A receives the side plate 311A (FIG. 7) of the drum cartridge 5.

2.1.4 Receiving Portion 29A

The receiving portion 29A is located between the guide 27A and the second end portion E12 of the side plate 21A in the first direction. In the state in which the drum cartridge 5 is mounted on the drawer 4 (FIG. 4), the receiving portion 28A receives the guided portion 32A (FIG. 7) of the drum cartridge 5.

As shown in FIG. 5, the receiving portion 29A is located opposite to the side plate 21B with respect to the receiving portion 28A in the second direction. In other words, the receiving portion 28A is located between the receiving portion 29A and the side plate 21B in the second direction.

2.1.5 Locking Portion 30A

As shown in FIG. 6, the locking portion 30A is provided at the edge of the side plate 21A. The locking portion 30A may be provided on the second surface S2 of the side plate 21A. The locking portion 30A is located between the first end portion 271 of the guide 27A and the second end portion 272 of the guide 27A in the first direction. The locking portion 30A is a groove. The locking portion 30A includes a protrusion 301. The protrusion 301 is located in the locking portion 30A. The protrusion 301 may be a plate spring.

As shown in FIG. 5, the locking portion 30A is located opposite to the side plate 21B with respect to the guide 26A in the second direction. The locking portion 30A is located between the guide 26A and the guided portion 22A in the second direction.

2.2 Side Plate 21B

As shown in FIG. 5, the side plate 21B is located at the second end portion of the drawer 4 in the second direction. The side plate 21B is apart from the side plate 21A in the second direction. The side plate 21B extends in the first direction. The side plate 21B includes a guide 26B, a guide 27B, a receiving portion 28B, a receiving portion 29B, and a locking portion 30B. The above explanation of the side plate 21A is true of the side plate 21B. Thus, explanation of the side plate 21B is dispensed with.

2.3 Guided Portions 22A, 22B

As shown in FIG. 6, the guided portion 22A is located between the second end portion E12 of the side plate 21A and the locking portion 30A in the first direction. The guided portion 22A is located between the receiving portion 29A and the locking portion 30A in the first direction.

As shown in FIG. 5, the guided portion 22A is located opposite to the side plate 21B with respect to the side plate 21A in the second direction. The guided portion 22A is located on the first surface S1 of the side plate 21A. The guided portion 22A is a protrusion. The guided portion 22A extends from the first surface S1 of the side plate 21A. The guided portion 22A may be attached to the first surface S1 of the side plate 21A. The guided portion 22A has a cylindrical shape. The guided portion 22A engages the guide 2C (FIG. 1) of the housing 2. The guided portion 22A is guided by the guide 2C.

The guided portion 22B is located opposite to the side plate 21A with respect to the side plate 21B in the second direction. The guided portion 22B is apart from the guided portion 22A in the second direction. When projected in the second direction, the guided portion 22B completely overlaps the guided portion 22A. The above explanation of the guided portion 22A is true of the guided portion 22B. Thus, explanation of the guided portion 22B is dispensed with.

2.4 Guided Portions 23A, 23B

As shown in FIG. 6, the guided portion 23A is apart from the guided portion 22A in the first direction. The guided portion 23A is located between the guided portion 22A and the locking portion 30A in the first direction.

As shown in FIG. 5, the guided portion 23A is located opposite to the side plate 21B with respect to the side plate 21A in the second direction. The guided portion 23A is located on the first surface S1 of the side plate 21A. The guided portion 23A is a protrusion. The guided portion 23A extends from the first surface S1 of the side plate 21A. The guided portion 23A may be attached to the first surface S1 of the side plate 21A. The guided portion 23A has a cylindrical shape. The guided portion 23A engages the guide 2C (FIG. 1) of the housing 2. The guided portion 23A is guided by the guide 2C.

The guided portion 23B is located opposite to the guided portion 23A with respect to the side plate 21B in the second direction. The guided portion 23B is apart from the guided portion 23A in the second direction. When projected in the second direction, the guided portion 23B completely overlaps the guided portion 23A. The above explanation of the guided portion 23A is true of the guided portion 23B. Thus, explanation of the guided portion 23B is dispensed with.

2.5 Bottom Plate 24

The bottom plate 24 is located between the side plate 21A and the side plate 21B in the second direction. The bottom plate 24 extends in the first direction and the second direction. The bottom plate 24 is connected to the side plate 21A and the side plate 21B.

2.6 Drawer Grip 25

The drawer grip 25 is configured to be gripped by a user when the user moves the drawer 4 between the inside position and the outside position. The drawer grip 25 is located at one end of the drawer 4 in the first direction. The drawer grip 25 extends in the second direction. The drawer grip 25 includes a first end portion and a second end portion in the second direction. The first end portion of the drawer grip 25 is connected to the first end portion E11 of the drawer side plate 21A, and the second end portion of the drawer grip 25 is connected to the first end portion of the drawer side plate 21B.

3. Details of Drum Cartridge 5

Figure 7:
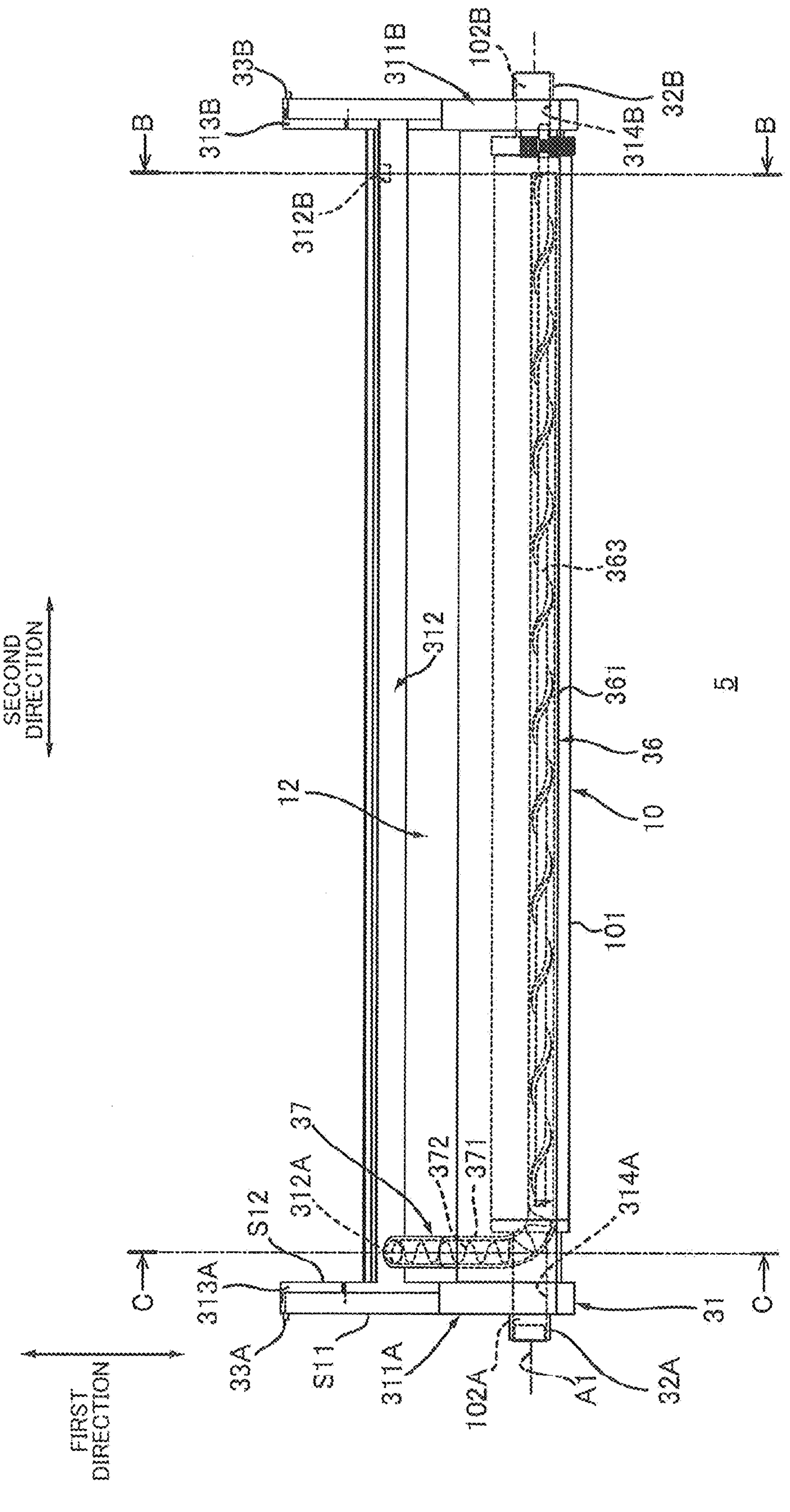
FIG. 7 is a plan view of the drum cartridge of FIG. 1.
Figure 10A:
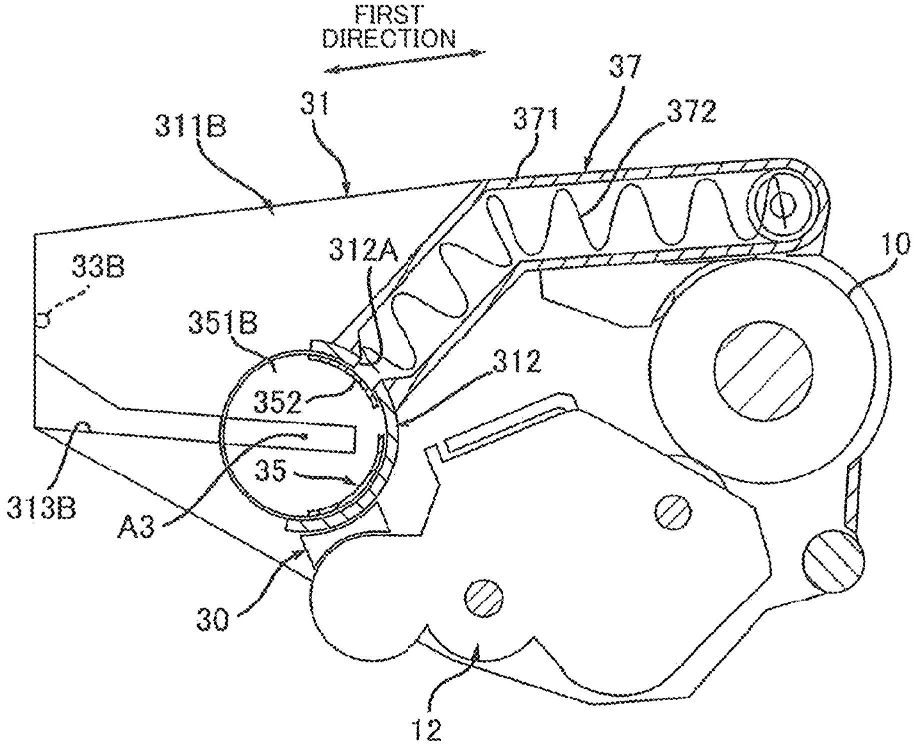
FIG. 10A is a cross-sectional view of the drum cartridge taken along line C-C in FIG. 7, the view illustrating the state in which the shutter is located at the closing position.
Figure 10B:
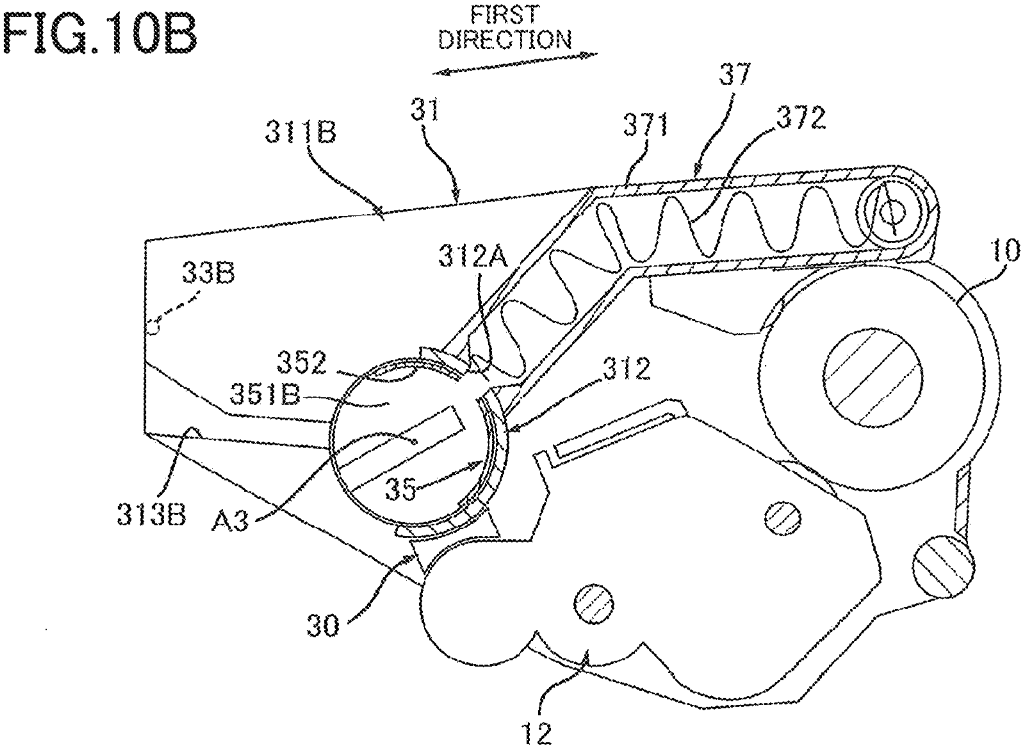
FIG. 10B is a view of the drum cartridge of FIG. 10A illustrating the state in which the shutter is located at the open position.

Referring next to FIGS. 7 and 10B, the drum cartridge 5 will be explained.

As shown in FIG. 7, the drum cartridge 5 extends in the second direction. The drum cartridge 5 includes a first end portion in the second direction and a second end portion that is apart from the first end portion in the second direction. The drum cartridge 5 includes a frame 31, the guided portions 32A, 32B, locking protrusions 33A, 33B, a seal 34 (FIG. 8A), a shutter 35 (FIG. 8A), a drum cleaner 36, and a waste-toner conveyor pipe 37, in addition to the photoconductive drum 10, the charging roller 11 (FIG. 1), and the developer device 12 (FIG. 1). The shutter 35 is one example of "second shutter".

3.1 Frame 31

The frame 31 supports the photoconductive drum 10, the charging roller 11, the developer device 12, the shutter 35, and the drum cleaner 36. In the state in which the drum cartridge 5 is mounted on the drawer 4 and the drawer 4 is located at the outside position (FIG. 2), at least a part of the frame 31 is located inside the housing 2. The frame 31 includes side plates 311A, 311B and a connection portion 312.

3.1.1 Side Plate 311A

The side plate 311A is located at the first end portion of the drum cartridge 5 in the second direction. The side plate 311A extends in a direction that intersects the axis A1, preferably, in a direction orthogonal to the axis A1. Specifically, the side plate 311A extends in the first direction in the state in which the drum cartridge 5 is mounted on the drawer 4. The side plate 311A includes a first surface S11 and a second surface S12 in the second direction. The second surface S12 is located between the first surface S11 and the side plate 311B in the second direction. The side plate 311A has a guide 313A (FIG. 8A), an aperture 314A (FIG. 7), an aperture 315A (FIG. 9A), and an aperture 316A (FIG. 9A). In other words, the drum cartridge 5 includes the guide 313A. The guide 313A is one example of "second guide".

3.1.1.1 Guide 313A

Figure 8A:
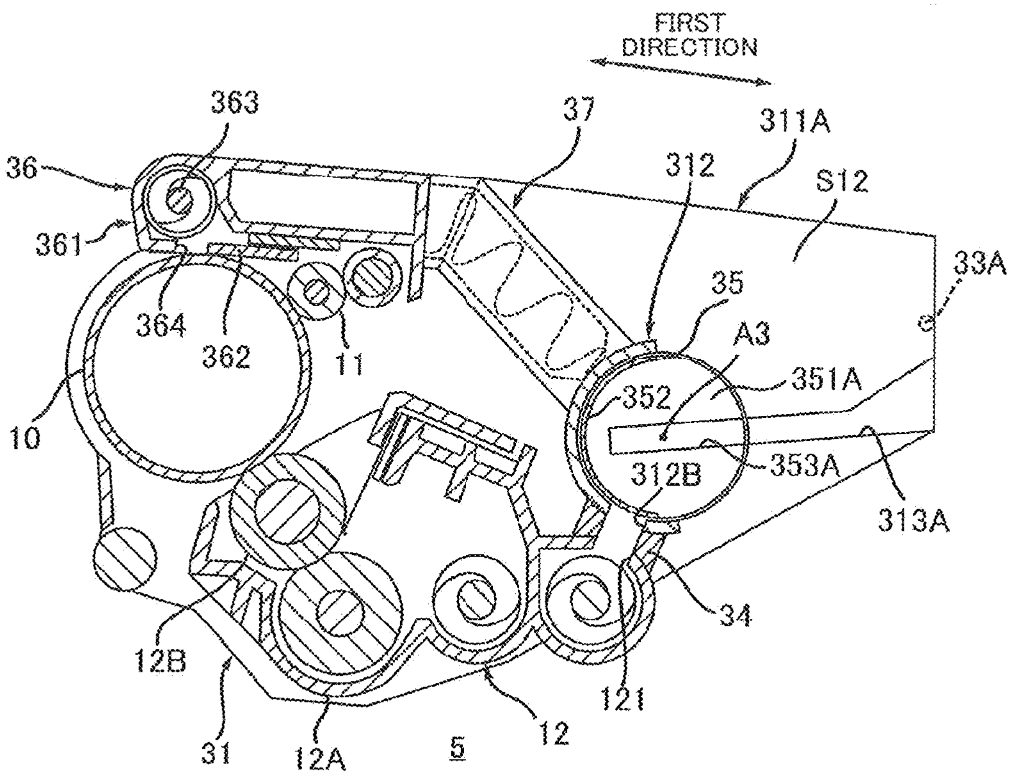
FIG. 8A is a cross-sectional view of the drum cartridge taken along line B-B in FIG. 7, the view illustrating a state in which a shutter is located at a closing position.
Figure 9A:
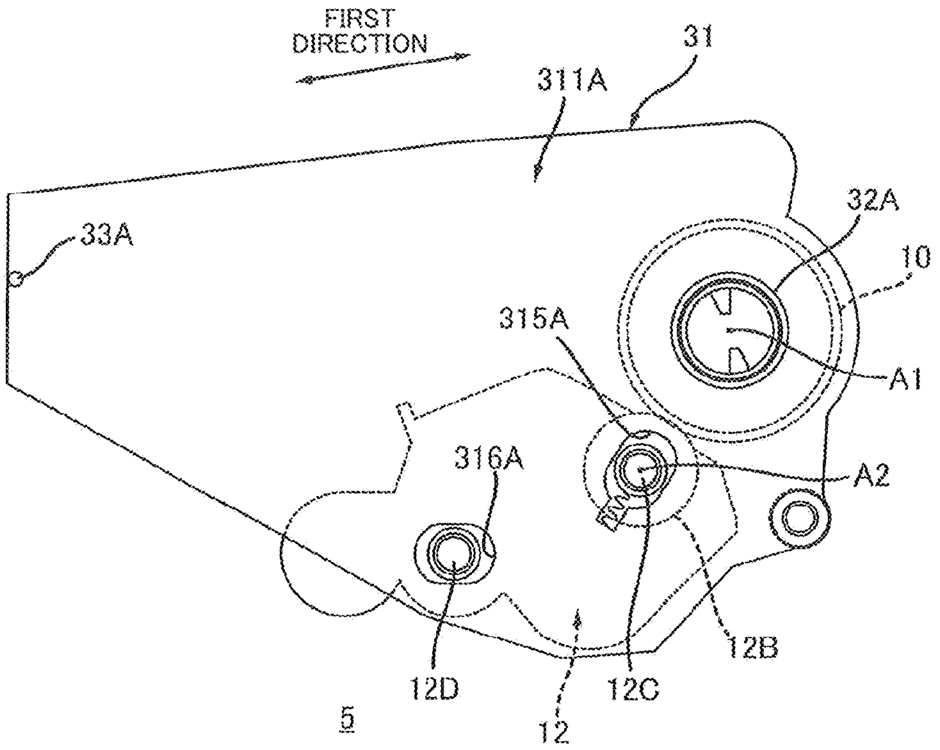
FIG. 9A is a side view of the drum cartridge of FIG. 7.

As shown in FIGS. 7 and 8A, the guide 313A is provided on the second surface S12 of the side plate 311A. The guide 313A is located opposite to the photoconductive drum 10 with respect to the shutter 35 in the first direction.

In the state in which the drum cartridge 5 is mounted on the drawer 4 (FIG. 4), the guide 313A extends in a direction in which the guide 26A of the drawer 4 extends. In the state in which the drum cartridge 5 is mounted on the drawer 4, the guide 313A is connected to the guide 26A. When the toner cartridge 6 is mounted on the drawer 4 in the state in which the drum cartridge 5 is mounted on the drawer 4, the guided portion 46A (FIG. 11) of the toner cartridge 6 engages the guide 313A. The guided portion 46A will be later explained. In mounting the toner cartridge 6 on the drawer 4 in the state in which the drum cartridge 5 is mounted on the drawer 4, the guide 313A guides the toner cartridge 6.

In the state in which the drum cartridge 5 is mounted on the drawer 4 and the drawer 4 is located at the outside position (FIG. 4), at least a part of the guide 313A is located inside the housing 2.

3.1.1.2 Aperture 314A

As shown in FIG. 7, the aperture 314A is a through-hole. One end of the photoconductive drum 10 is supported by the aperture 314A.

Specifically, the photoconductive drum 10 includes a drum body 101 and flanges 102A, 102B. The drum body 101 extends in the second direction and has a cylindrical shape. The drum body 101 includes a first end portion in the second direction and a second end portion that is apart from the first end portion in the second direction. The flange 102A is located at the first end portion of the drum body 101. The flange 102A is attached to the first end portion of the drum body 101 so as to extend in the second direction. The flange 102A has a cylindrical shape. The flange 102B is located at the second end portion of the drum body 101. The flange 102B is attached to the second end portion of the drum body 101 so as to extend in the second direction. The flange 102B has a cylindrical shape. The flange 102A is supported by the aperture 314A.

3.1.1.3 Apertures 315A, 316A

As shown in FIG. 9A, the aperture 315A is an elongate aperture and extends in a direction directed from the axis A2 toward the axis A1. The shaft 12C of the developer roller 12B engages the aperture 315A. The aperture 315A guides the developer roller 12B in the direction directed from the axis A2 toward the axis A1.

The aperture 316A is an elongate aperture and extends in the first direction. A boss 12D of the developer device 12 is supported by the aperture 315A, so that the developer device 12 is supported by the side plate 311A.

3.1.2 Side Plate 311B

Figure 9B:
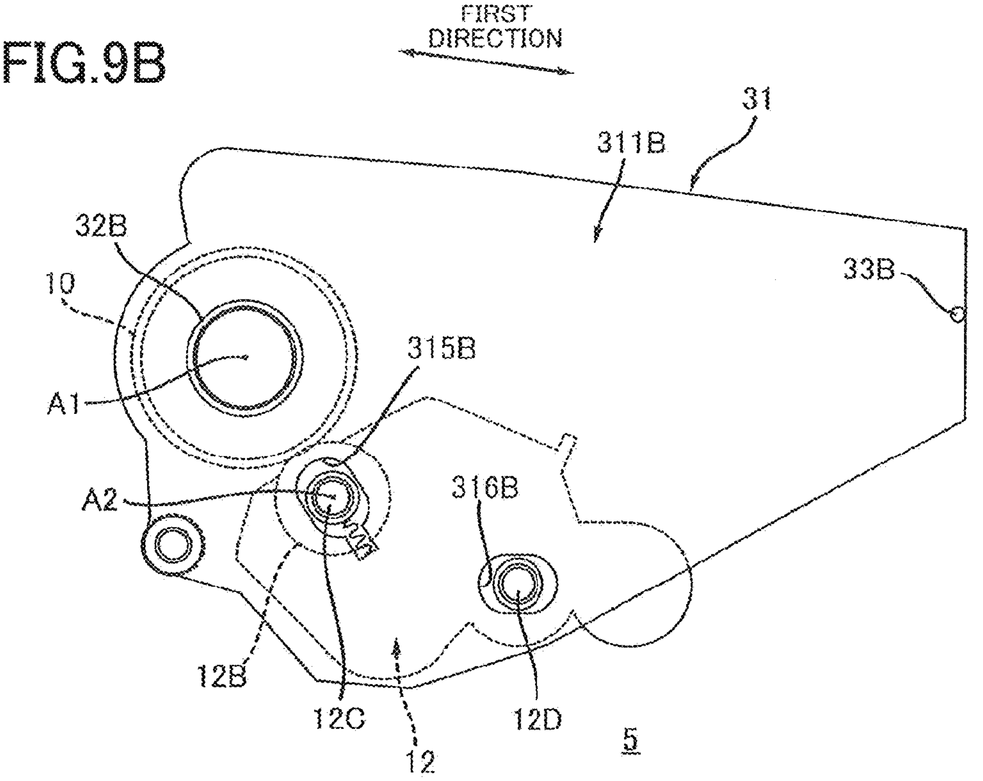
FIG. 9B is a side view of the drum cartridge of FIG. 7 viewed in a direction opposite to a direction viewed in FIG. 9A.

As shown in FIG. 7, the side plate 311B is located at the second end portion of the drawer 4 in the second direction. The side plate 311B is apart from the side plate 311A in the second direction. As shown in FIGS. 7 and 9A, the side plate 311B has a guide 313B (FIG. 10B), an aperture 314B (FIG. 7), an aperture 315B (FIG. 9B), and an aperture 316B (FIG. 9B). The above explanation of the side plate 311A is true of the side plate 311B. Thus, explanation of the side plate 311B is dispensed with.

3.1.3 Connection Portion 312

As shown in FIG. 8A, the connection portion 312 is located on the developer device 12 in the state in which the drum cartridge 5 is mounted on the drawer 4. In the state in which the drum cartridge 5 and the toner cartridge 6 are mounted on the drawer 4, the connection portion 312 is connected to a toner supply portion 412 (FIG. 12A) and a waste-toner inlet portion 414 (FIG. 13A) of the toner cartridge 6. The connection portion 312 is located between the photoconductive drum 10 and the locking protrusion 33A in the first direction in the state in which the drum cartridge 5 is mounted on the drawer 4. The connection portion 312 is located between the photoconductive drum 10 and the guide 313A in the first direction in the state in which the drum cartridge 5 is mounted on the drawer 4.

As shown in FIG. 7, the connection portion 312 is located between the side plate 311A and the side plate 311B in the second direction. The connection portion 312 extends in the second direction. The connection portion 312 includes a first end portion and a second end portion in the second direction. The second end portion is apart from the first end portion in the second direction. The first end portion of the connection portion 312 in the second direction is connected to the side plate 311A, and the second end portion of the connection portion 312 in the second direction is connected to the side plate 311B. The connection portion 312 has a semi-cylindrical shape. The connection portion 312 has a waste-toner discharge opening 312A and an inlet opening 312B. In other words, the drum cartridge 5 has the waste-toner discharge opening 312A and the inlet opening 312B.

The waste-toner discharge opening 312A is located at the first end portion of the connection portion 312 in the second direction. The toner conveyed by the waste-toner conveyor pipe 37 can be discharged through the waste-toner discharge opening 312A. The waste-toner discharge opening 312A communicates with an inner space of the waste-toner conveyor pipe 37.

The inlet opening 312B is located at the second end portion of the connection portion 312 in the second direction. In the state in which the drum cartridge 5 and the toner cartridge 6 are mounted on the drawer 4 (FIG. 1), the toner discharged from a discharge opening 415 of the toner cartridge 6 can be received by the inlet opening 312B. The discharge opening 415 will be later explained.

As shown in FIG. 8A, the inlet opening 312B communicates with an inner space of the developer housing 12A. Specifically, the developer housing 12A has a through-hole 121 that communicates with the inner space of the developer housing 12A. The inlet opening 312B communicates with the through-hole 121. The inlet opening 312B communicates with the inner space of the developer housing 12A via the through-hole 121.

3.2 Guided Portion 32A

As shown in FIG. 7, the guided portion 32A is located opposite to the side plate 311B with respect to the side plate 311A in the second direction. The guided portion 32A is located on the first surface S11 of the side plate 311A. The guided portion 32A is a protrusion that extends from the first surface S11 of the side plate 311A. The guided portion 32A may be attached to the first surface S11 of the side plate 311A. The guided portion 32A extends in the second direction. The guided portion 32A extends along the axis A1 and has a cylindrical shape.

In the present embodiment, one end of the photoconductive drum 10 in the second direction is fitted to the guided portion 32A. The flange 102A of the photoconductive drum 10 is fitted to the guided portion 32A. The guided portion 32A may be the one end of the photoconductive drum 10 in the second direction. The guided portion 32A may be the flange 102A of the photoconductive drum 10. The one end of the photoconductive drum 10 in the second direction need not be necessarily fitted to the guided portion 32A.

In mounting the drum cartridge 5 on the drawer 4 (FIGS. 3 and 4), the guided portion 32A is guided by the guide 27A (FIG. 3) of the drawer 4. In the state in which the drum cartridge 5 is mounted on the drawer 4, the guided portion 32A engages the receiving portion 29A (FIG. 3) of the drawer 4.

3.3 Guided Portion 32B

The guided portion 32B is located opposite to the side plate 311A with respect to the side plate 311B in the second direction. The guided portion 32B is apart from the guided portion 32A in the second direction. The above explanation of the guided portion 32A is true of the guided portion 32B. Thus, explanation of the guided portion 32B is dispensed with.

3.4 Locking Protrusion 33A

The locking protrusion 33A is located opposite to the side plate 311B with respect to the side plate 311A in the second direction. The locking protrusion 33A is located on the first surface S1 of the side plate 311A. The locking protrusion 33A extends from the first surface S1 of the side plate 311A. The locking protrusion 33A may be attached to the first surface S11 of the side plate 311A. The locking protrusion 33A extends in the second direction and has a cylindrical columnar shape.

As show in FIG. 8A, the locking protrusion 33A is apart from the guided portion 32A in the first direction. The locking protrusion 33A is located opposite to the guided portion 32A with respect to the shutter 35 in the first direction. The locking protrusion 33A is located opposite to the guided portion 32A with respect to the inlet opening 312B in the first direction. In the state in which the drum cartridge 5 is mounted on the drawer 4, the locking protrusion 33A engages the locking portion 30A (FIG. 6) of the drawer 4. When the locking protrusion 33A engages the locking portion 30A, the drum cartridge 5 is locked at the locking portion 30A. In other words, the drum cartridge 5 is locked at the locking portion 30A in the state in which the drum cartridge 5 is mounted on the drawer 4. The drum cartridge 5 that is thus locked at the locking portion 30A is prevented from coming off from the drawer 4. Specifically, the drum cartridge 5 is prevented from coming off from the drawer 4 when the toner cartridge 6 is detached from the drawer 4. This configuration enables the toner cartridge 6 to be smoothly replaced in the state in which the drum cartridge 6 is mounted on the drawer 4.

3.5 Locking Protrusion 33B

As shown in FIG. 7, the locking protrusion 33B is located opposite to the side plate 311A with respect to the side plate 311B in the second direction. The locking protrusion 33B is apart from the locking protrusion 33A in the second direction. The above explanation of the locking protrusion 33A is true of the locking protrusion 33B. Thus, explanation of the locking protrusion 33B is dispensed with.

3.6 Seal 34

As shown in FIG. 8A, the seal 34 is provided between the connection portion 312 and the developer housing 12A. The seal 34 seals between the connection portion 312 and the developer housing 12A so as to surround the inlet opening 312B and the through-hole 121. This arrangement prevents leakage of the toner received by the inlet opening 312B from between the connection portion 312 and the developer housing 12A. The seal 34 has elasticity. Specifically, the seal 34 is a sponge.

3.7 Shutter 35

Figure 8B:
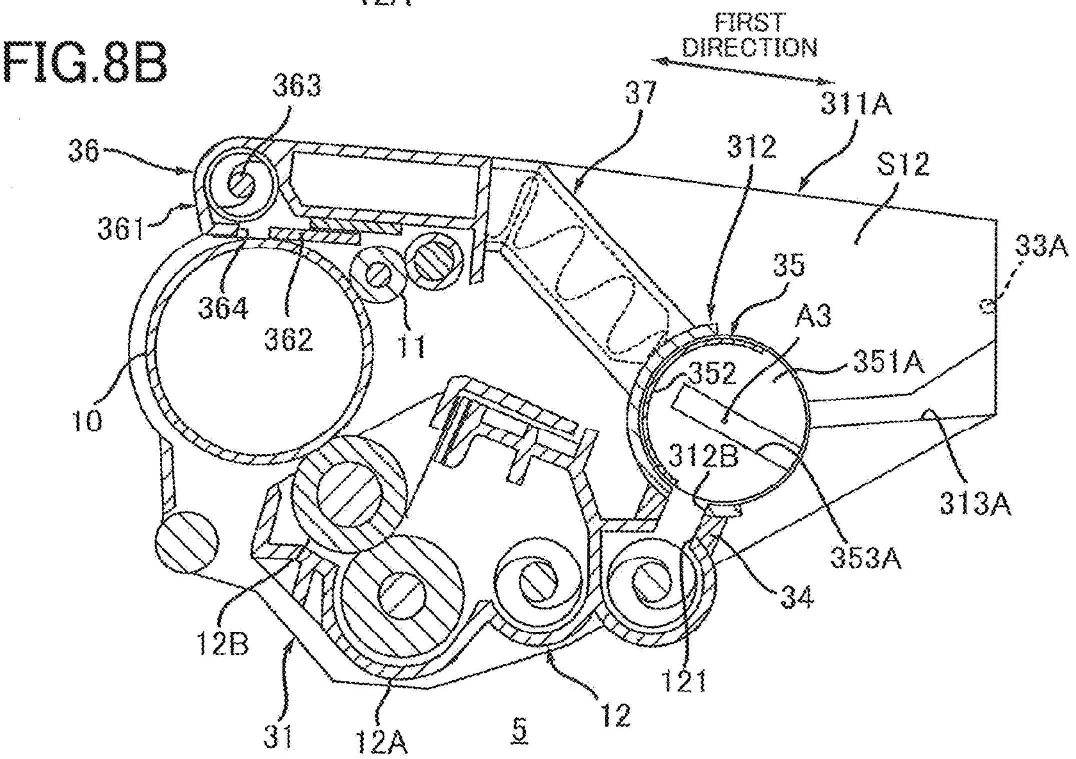
FIG. 8B is a view of the drum cartridge of FIG. 8A illustrating a state in which the shutter is located at an open position.

As shown in FIGS. 8A and 8B, the shutter 35 is movable between a closing position (FIG. 8A) and an open position (FIG. 8B). The shutter 35 is pivotable about an axis A3 between the closing position and the open position. As shown in FIGS. 8A and 10A, when the shutter 35 is located at the closing position, the shutter 35 closes the inlet opening 312B and the waste-toner discharge opening 312A. As shown in FIGS. 8B and 10B, when the shutter 35 is located at the open position, the shutter 35 opens the inlet opening 312B and the waste-toner discharge opening 312A. The shutter 35 extends in the second direction. The shutter 35 includes a first end portion in the second direction and a second end portion that is apart from the first end portion in the second direction. As shown in FIGS. 8A and 10A, the shutter 35 includes an end plate 351A (FIG. 8A), an end plate 351B (FIG. 10A), and a shutter body 352.

3.7.1 End Plate 351A

As shown in FIG. 8A, the end plate 351A is located at the first end portion of the shutter 35 in the second direction. The end plate 351A is located on the second surface S12 of the side plate 311A of the frame 31. The end plate 351A is a circular plate. The end plate 351A is rotatable about the axis A3. The end plate 351A has a groove 353A. In other words, the shutter 35 has a groove 353A.

The groove 353A extends in the radial direction of the end plate 351A. In the state in which the shutter 35 is located at the closing position, the groove 353A is connected to the guide 313A. In the state in which the shutter 35 is located at the open position, the groove 353A is not connected to the guide 313A as shown in FIG. 8B. In the state in which the drum cartridge 5 and the toner cartridge 6 are mounted on the drawer 4, the guided portion 46A (FIG. 11) of the toner cartridge 6 engages the groove 353A.

3.7.2 End Plate 351B

As shown in FIG. 10A, the end plate 351B is apart from the end plate 351A in the second direction. The end plate 351B is located at the second end portion of the shutter 35 in the second direction.

The above explanation of the end plate 351A is true of the end plate 351B. Thus, explanation of the end plate 351B is dispensed with.

3.7.2 Shutter Body 352

As shown in FIGS. 8A and 10A, the shutter body 352 closes the waste-toner discharge opening 312A and the inlet opening 312B in the state in which the shutter 35 is located at the closing position. The shutter body 352 is located between the end plate 351A and the end plate 351B in the second direction. The shutter body 352 extends in the second direction. The shutter body 352 includes a first end portion in the second direction and a second end portion that is apart from the first end portion in the second direction. The first end portion of the shutter body 352 in the second direction is connected to the end plate 351A, and the second end portion of the shutter body 352 in the second direction is connected to the end plate 351B. The shutter body 352 is pivotable about the axis A3 together with the end plate 351A and the end plate 351B.

3.8 Drum Cleaner 36

As shown in FIG. 7, the drum cleaner 36 is located between the side plate 311A and the side plate 311B in the second direction. The drum cleaner 36 extends in the second direction. The drum cleaner 36 includes a first end portion in the second direction and a second end portion that is apart from the first end portion in the second direction. The first end portion of the drum cleaner 36 is connected to the side plate 311A, and the second end portion of the drum cleaner 36 is connected to the side plate 311B. The drum cleaner 36 collects waste toner that remains on the surface of the photoconductive drum 10 without being transferred to the sheet S.

As shown in FIG. 8A, the drum cleaner 36 includes a cleaner housing 361, a cleaning blade 362, and an auger screw 363.

3.8.1 Cleaner Housing 361

As shown in FIG. 7, the cleaner housing 361 is located between the side plate 311A and the side plate 311B in the second direction. The cleaner housing 361 extends in the second direction. The cleaner housing 361 includes a first end portion and a second end portion in the second direction. The first end portion of the cleaner housing 361 is connected to the side plate 311A, and the second end portion of the cleaner housing 361 is connected to the side plate 311B.

As shown in FIG. 8A, the cleaner housing 361 has an opening 364.

3.8.2 Cleaning Blade 362

The cleaning blade 362 is attached to the cleaner housing 361. The cleaning blade 362 is in contact with the surface of the photoconductive drum 10 at an edge thereof. When the photoconductive drum 10 rotates, the waste toner on the surface of the photoconductive drum 10 comes into contact with the edge of the cleaning blade 362, so as to be removed from the surface of the photoconductive drum 10. The thus removed waste toner is stored in the cleaner housing 361 through the opening 364.

3.8.3 Auger Screw 363

The auger screw 363 is disposed in the cleaner housing 361.

As shown in FIG. 7, the auger screw 363 extends in the second direction. The auger screw 363 conveys the waste toner in the cleaner housing 361 toward the waste-toner conveyor pipe 37.

3.9 Waste-Toner Conveyor Pipe 37

As shown in FIG. 7, the waste-toner conveyor pipe 37 conveys the waste toner from the drum cleaner 36 to the waste-toner discharge opening 312A. Specifically, the waste-toner conveyor pipe 37 conveys the waste toner in the cleaner housing 361 to the waste-toner discharge opening 312A.

As shown in FIG. 10A, the waste-toner conveyor pipe 37 includes a pipe 371 and a screw 372.

The pipe 371 includes a first end portion and a second end portion that is apart from the first end portion. The first end portion of the pipe 371 is connected to the cleaner housing 361 (FIG. 7) of the drum cleaner 36, and the second end portion of the pipe 371 is connected to the connection portion 312. An inner space of the pipe 371 communicates with an inner space of the cleaner housing 361 and the waste-toner discharge opening 312A. Thus, the waste toner in the cleaner housing 361 is discharged from the waste-toner discharge opening 312A through the pipe 371 as shown in FIG. 10B in the state in which the shutter 35 is located at the open position.

The screw 372 is disposed in the pipe 371. The screw 372 conveys the waste toner in the pipe 371 toward the waste-toner discharge opening 312A. The screw 372 extends in a direction in which the pipe 371 extends. The screw 372 is connected to the auger screw 363 (FIG. 7). The screw 372 is rotatable together with the auger screw 363. Specifically, the screw 372 is a shaftless screw.

4. Details of Toner Cartridge 6

Referring next to FIGS. 11-14, the toner cartridge 6 will be explained.

Figure 11:
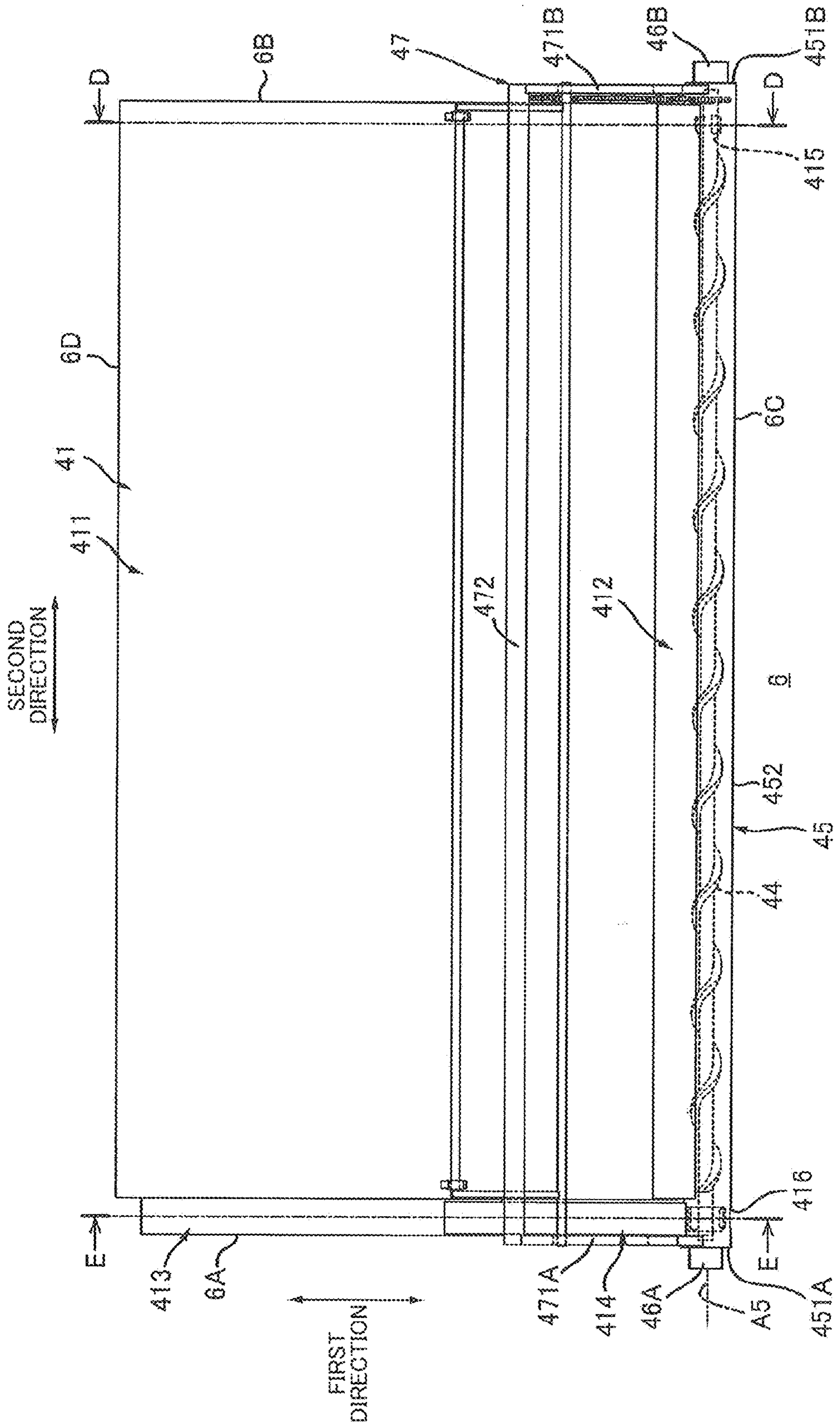
FIG. 11 is a plan view of the toner cartridge in a state illustrated in FIG. 4 in which a shutter is located at a closing position.
Figure 12A:
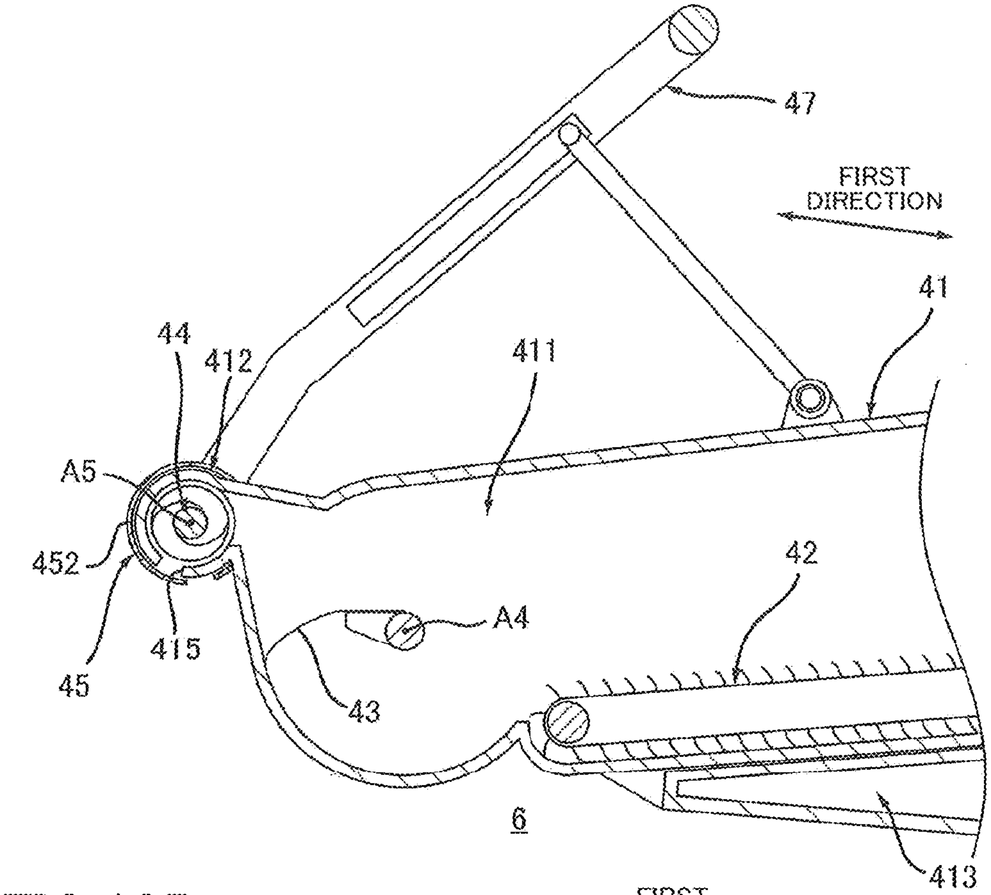
FIG. 12A is a cross-sectional view of the toner cartridge taken along line D-D in FIG. 11, the view illustrating a state in which the shutter is located at the closing position.

As shown in FIG. 11, the toner cartridge 6 extends in the second direction. The toner cartridge 6 includes a first end portion 6A and a second end portion 6B in the second direction. The second end portion 6B is apart from the first end portion 6A in the second direction. The toner cartridge 6 extends in the first direction. The toner cartridge 6 includes a first end portion 6C and a second end portion 6D in the first direction. The second end portion 6D is apart from the first end portion 6C in the first direction. As shown in FIGS. 11 and 12A, the toner cartridge 6 includes a toner cartridge housing 41, a belt conveyor 42, an agitator 43, an auger screw 44, a shutter 45 (as one example of "first shutter"), the guided portion 46A, a guided portion 46B, and a handle 47.

4.1 Toner Cartridge Housing 41

The toner cartridge housing 41 includes a toner storage portion 411, the toner supply portion 412, a waste-toner storage portion 413, and a waste-toner inlet portion 414 (FIG. 11).

4.1.1 Toner Storage Portion 411

The toner storage portion 411 stores the toner.

4.1.2 Toner Supply Portion 412

The toner supply portion 412 is located at the first end portion 6C of the toner cartridge 6 in the first direction. In the state in which the drum cartridge 5 and the toner cartridge 6 are mounted on the drawer 4, the toner supply portion 412 is capable of supplying the toner to the developer device 12 (FIG. 1) of the drum cartridge 5. As shown in FIG. 12A, the toner supply portion 412 is connected to the toner storage portion 411. An inner space of the toner supply portion 412 communicates with an inner space of the toner storage portion 411. The inner space of the toner supply portion 412 does not communicate with an inner space of the waste-toner storage portion 413 and an inner space of the waste-toner inlet portion 414 (FIG. 11).

As shown in FIG. 11, the toner supply portion 412 extends in the second direction and has a cylindrical shape. The toner supply portion 412 has a discharge opening 415. In other words, the toner cartridge 6 has the discharge opening 415.

The discharge opening 415 is located at the second end portion 6B of the toner cartridge 6 in the second direction. As shown in FIG. 12A, the discharge opening 415 communicates with the inner space of the toner supply portion 412. The toner in the toner supply portion 412 can be discharged through the discharge opening 415. The discharge opening 415 is located inside the housing 2 in the state in which the toner cartridge 6 and the drum cartridge 5 are mounted on the drawer 4 and the drawer 4 is located at the outside position (FIG. 2).

4.1.3 Waste-Toner Storage Portion 413

As shown in FIG. 11, the waste-toner storage portion 413 stores the waste toner. In the state in which the toner cartridge 6 and the drum cartridge 5 are mounted on the drawer 4 as shown in FIG. 1, the waste-toner storage portion 413 is located below the toner storage portion 411. The inner space of the waste-toner storage portion 413 does not communicate with the inner space of the toner storage portion 411 and the inner space of the toner supply portion 412.

4.1.4 Waste-Toner Inlet Portion 414

Figure 13A:
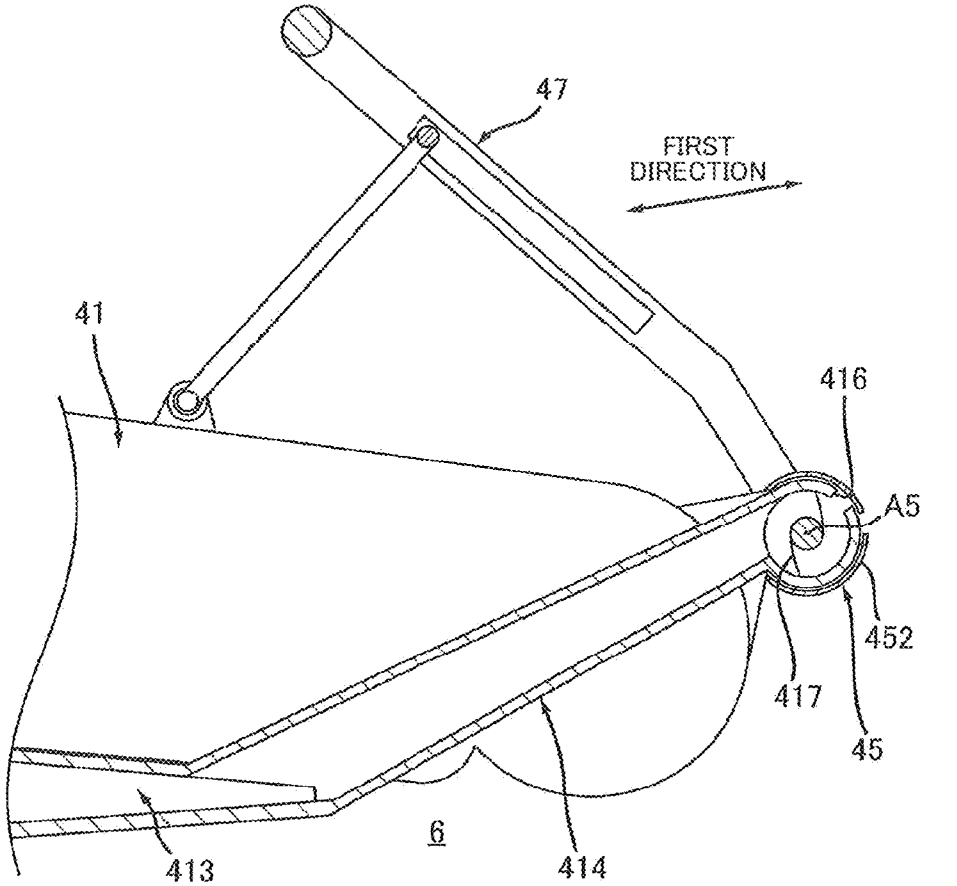
FIG. 13A is a cross-sectional view of the toner cartridge taken along line E-E in FIG. 11, the view illustrating the state in which the shutter is located at the closing position.

As shown in FIGS. 11 and 13A, the waste-toner inlet portion 414 is located at the first end portion 6A of the toner cartridge 6 in the second direction. The waste-toner inlet portion 414 is a pipe. The waste-toner inlet portion 414 includes a first end portion and a second end portion in a direction of extension thereof. The first end portion of the waste-toner inlet portion 414 is located at the first end portion 6C of the toner cartridge 6 in the first direction. The first end portion of the waste-toner inlet portion 414 is located between the guided portion 46A and the toner supply portion 412 in the second direction. The second end portion of the waste-toner inlet portion 414 is connected to the waste-toner storage portion 413.

As shown in FIG. 13A, the inner space of the waste-toner inlet portion 414 communicates with the inner space of the waste-toner storage portion 413. The inner space of the waste-toner inlet portion 414 does not communicate with the inner space of the toner storage portion 411 and the inner space of the toner supply portion 412. In the state in which the toner cartridge 6 and the drum cartridge 5 are mounted on the drawer 4, the second end portion of the waste-toner inlet portion 414 is located at a height level lower than the first end portion of the waste-toner inlet portion 414. The waste-toner inlet portion 414 has a waste-toner inlet opening 416. The waste-toner inlet portion 414 further has a vane 417.

As shown in FIG. 11, the waste-toner inlet opening 416 is located at the first end portion of the waste-toner inlet portion 414. The waste-toner inlet opening 416 is located at the first end portion 6C of the toner cartridge 6 in the first direction. The waste-toner inlet opening 416 is located between the guided portion 46A and the toner supply portion 412 in the second direction. As shown in FIG. 13A, the waste-toner inlet opening 416 communicates with the inner space of the waste-toner inlet portion 414.

The vane 417 is disposed in the first end portion of the waste-toner inlet portion 414. The vane 417 is rotatable together with the auger screw 44 (FIG. 11) of the toner supply portion 412.

4.2 Belt Conveyor 42

As shown in FIG. 12A, the belt conveyor 42 is disposed in the toner storage portion 411. The belt conveyor 42 conveys the toner in the toner storage portion 411 toward the agitator 43.

4.3 Agitator 43

The agitator 43 is disposed in the toner storage portion 411. The agitator 43 conveys the toner in the toner storage portion 411 to the toner supply portion 412. The agitator 43 is rotatable about an axis A4. In the state in which the toner cartridge 6 and the drum cartridge 5 are mounted on the drawer 4, the axis A4 of the agitator 43 is located at a height level lower than the discharge opening 415.

4.4 Auger Screw 44

The auger screw 44 is disposed in the toner supply portion 412. As shown in FIG. 11, the auger screw 44 extends in the second direction. The auger screw 44 conveys the toner in the toner supply portion 412 toward the discharge opening 415.

4.5 Shutter 45

Figure 12B:
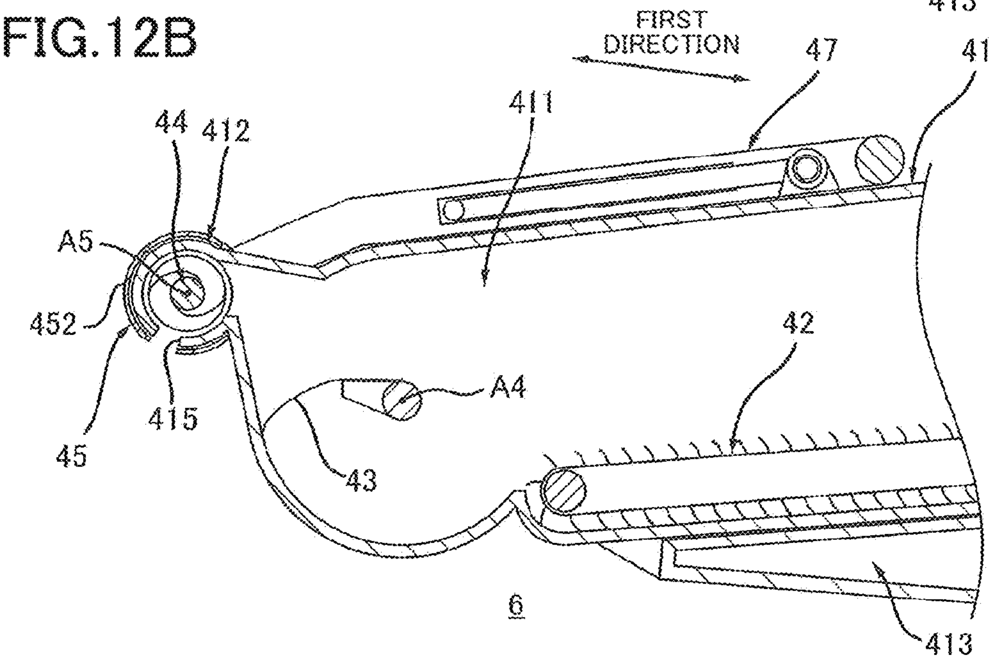
FIG. 12B is a view of the toner cartridge of FIG. 12A illustrating a state in which the shutter is located at an open position.
Figure 13B:
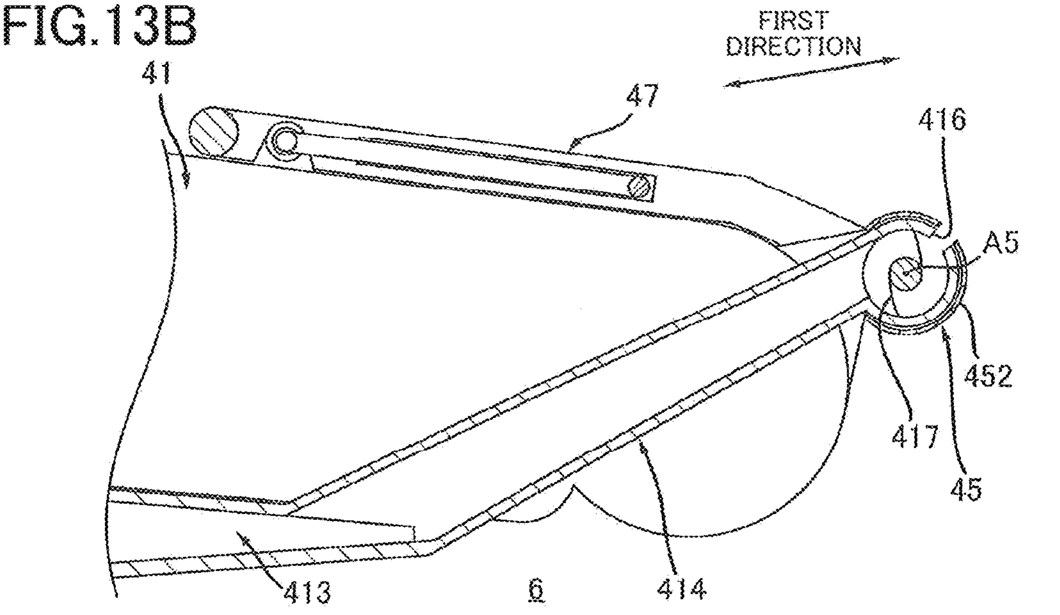
FIG. 13B is a view of the toner cartridge of FIG. 13A illustrating the state in which the shutter is located at the open position.

As shown in FIGS. 12A and 12B, the shutter 45 is movable between a closing position (FIG. 12A) and an open position (FIG. 12B). As shown in FIG. 12A, the shutter 45 closes the discharge opening 415 in the state in which the shutter 45 is located at the closing position. As shown in FIG. 13A, the shutter 45 further closes the waste-toner inlet opening 416 in the state in which the shutter 45 is located at the closing position. As shown in FIG. 12B, the shutter 45 opens the discharge opening 415 in the state in which the shutter 45 is located at the open position. As shown in FIG. 13B, the shutter 45 further opens the waste-toner inlet opening 416 in the state in which the shutter 45 is located at the open position.

As shown in FIG. 11, the shutter 45 extends in the second direction. The shutter 45 includes a first end portion in the second direction and a second end portion that is apart from the first end portion in the second direction. The shutter 45 includes end plates 451A, 451B and a shutter body 452.

4.5.1 End Plates 451A, 451B

Figure 14:
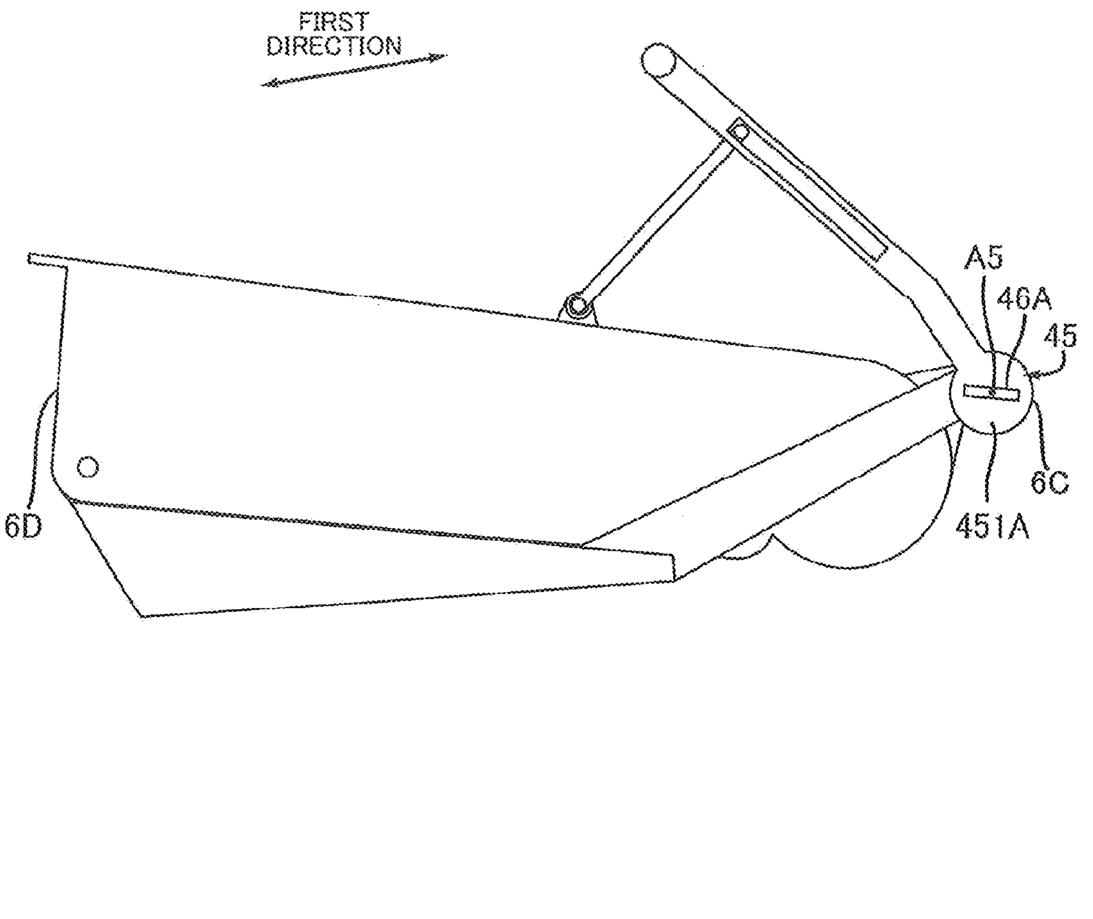
FIG. 14 is a side view of the toner cartridge of FIG. 11.

As shown in FIGS. 11 and 14, the end plate 451A is located at the first end portion of the shutter 45 in the second direction. The end plate 451A is located opposite to the toner supply portion 412 with respect to the first end portion of the waste-toner inlet portion 414 in the second direction. In other words, the first end portion of the waste-toner inlet portion 414 is located between the end plate 451A and the toner supply portion 412 in the second direction. The end plate 451A is a circular plate. The end plate 451A is rotatable about an axis A5.

As shown in FIG. 11, the end plate 451B is located at the second end portion of the shutter 45 in the second direction. The end plate 451B is apart from the end plate 451A in the second direction. The end plate 451B is located opposite to the end plate 451A with respect to the toner supply portion 412 in the second direction. In other words, the toner supply portion 412 is located between the end plate 451A and the end plate 451B. The above explanation of the end plate 451A is true of the end plate 451B. Thus, explanation of the end plate 451B is dispensed with.

4.5.2 Shutter Body 452

As shown in FIGS. 12A and 13A, the shutter body 452 closes the discharge opening 415 and the waste-toner inlet opening 416 in the state in which the shutter 45 is located at the closing position. As shown in FIG. 11, the shutter body 452 is located between the end plate 451A and the end plate 451B in the second direction. The shutter body 452 extends in the second direction. The shutter body 452 includes a first end portion in the second direction and a second end portion that is apart from the first end portion in the second direction. The first end portion of the shutter body 452 in the second direction is connected to the end plate 451A, and the second end portion of the shutter body 452 in the second direction is connected to the end plate 451B. The shutter body 452 is pivotable about the axis A5 together with the end plate 451A and the end plate 451B.

4.6 Guided Portions 46A, 46B

As shown in FIG. 11, the guided portion 46A is located at the first end portion 6A of the toner cartridge 6 in the second direction. The guided portion 46A extends from the end plate 451A of the shutter 45. The guided portion 46A may be attached to the end plate 451A of the shutter 45.

The guided portion 46A is a protrusion. That is, the shutter 45 includes a protrusion. Specifically, the guided portion 46A is a rib as shown in FIG. 14. The guided portion 46A extends in the radial direction of the end plate 451A.

The guided portion 46A is guided by the guide 26A (FIG. 4) of the drawer 4 and the guide 313A (FIG. 4) of the drum cartridge 5 in mounting the toner cartridge 6 on the drawer 4. In other words, the guide 26A and the guide 313A guide the guided portion 46A of the shutter 45 in mounting the toner cartridge 6 on the drawer 4. Thus, the guide 313A guides the shutter 45 of the toner cartridge 6 via the guided portion 46A in mounting the toner cartridge 6 on the drawer 4.

In the state in which the drum cartridge 5 and the toner cartridge 6 are mounted on the drawer 4 (FIG. 2), the guided portion 46A engages the groove 353A (FIG. 8A) of the drum cartridge 5, whereby the shutter 35 (FIG. 8A) becomes movable together with the shutter 45. In the state in which the shutter 45 is located at the closing position (FIG. 12A), the shutter 35 is located at the closing position (FIG. 8A). In the state in which the shutter 45 is located at the open position (FIG. 12B), the shutter 35 is located at the open position (FIG. 8B).

As shown in FIG. 11, the guided portion 46B is apart from the guided portion 46A in the second direction. The guided portion 46B is located at the second end portion 6B of the toner cartridge 6 in the second direction. The guided portion 46B extends from the end plate 451B of the shutter 45. The guided portion 46B may be attached to the end plate 451B of the shutter 45. The above explanation of the guided portion 46A is true of the guided portion 46B. Thus, explanation of the guided portion 46B is dispensed with.

4.7 Handle 47

As shown in FIG. 12A, the handle 47 is gripped by the user when the user replaces the toner cartridge 6. As shown in FIGS. 12A and 12B, the handle 47 is pivotable about the axis A5 between a first position (FIG. 12A) and a second position (FIG. 12B). The handle 47 moves in conjunction with the shutter 45. As shown in FIG. 12A, the shutter 45 is located at the closing position when the handle 47 is located at the first position. As shown in FIG. 12B, the shutter 45 is located at the open position when the handle 47 is located at the second position.

As shown in FIG. 11, the handle 47 includes arms 471A, 471B and a grip 472.

The arm 471A extends from the first end portion of the shutter 45 in the second direction. The arm 471A may be attached to the first end portion of the shutter 45 in the second direction.

The arm 471B is apart from the arm 471A in the second direction. The arm 471B extends from the second end portion of the shutter 45 in the second direction. The arm 471B may be attached to the second end portion of the shutter 45 in the second direction.

The grip 472 is located between the arm 471A and the arm 471B in the second direction. The grip 472 extends in the second direction. The grip 472 includes a first end portion in the second direction and a second end portion that is apart from the first end portion in the second direction. The first end portion of the grip 472 in the second direction is connected to the arm 471A, and the second end portion of the grip 472 in the second direction is connected to the arm 471B. In the state in which the drum cartridge 5 and the toner cartridge 6 are mounted on the drawer 4 and the drawer 4 is located at the outside position (FIG. 2), the grip 472 is located outside the housing 2. In the state in which the drum cartridge 5 and the toner cartridge 6 are mounted on the drawer 4 and the drawer 4 is located at the outside position, the guided portion 23A is located between the discharge opening 415 and the grip 472 in the first direction.

5. Mounting of Drum Cartridge

There will be next explained mounting of the drum cartridge 5 on the drawer 4.

In mounting the drum cartridge 5 on the drawer 4, the user moves the cover 2B to the open position and pulls the drawer 4 out of the housing 2.

As shown in FIG. 3, the user then places the drum cartridge 5 on the drawer 4 in the state in which the drawer 4 is located at the outside position.

When the user places the drum cartridge 5 on the drawer 4 located at the outside position, the side plate 311A (FIG. 7) of the drum cartridge 5 comes into contact with the guide 26A of the drawer 4 and the guided portion 32A (FIG. 7) of the drum cartridge 5 comes into contact with the guide 27A of the drawer 4.

The user then slides the drum cartridge 5 toward the housing 2.

In this instance, the side plate 311A of the drum cartridge 5 is guided by the guide 26A, and the guided portion 32A of the drum cartridge 5 is guided by the guide 27A. Thus, the drum cartridge 5 is slid toward the inside of the housing 2.

When the side plate 311A of the drum cartridge 5 engages the receiving portion 28A, the guided portion 32A of the drum cartridge 5 engages the receiving portion 29A, and the locking protrusion 33A (FIG. 7) of the drum cartridge 5 engages the locking portion 30A, mounting of the drum cartridge 5 on the drawer 4 is completed as shown in FIG. 4. In the state in which the drum cartridge 5 is mounted on the drawer 4, the guide 313A of the drum cartridge 5 is connected to the guide 26A of the drawer 4.

In detaching the drum cartridge 5 from the drawer 4, the user withdraws the drum cartridge 5 from the drawer 4 in the first direction in the state in which the drawer 4 is located at the outside position.

In this instance, the locking protrusion 33A is disengaged from the locking portion 30A, so that the drum cartridge 5 is detached from the drawer 4.

6. Mounting of Toner Cartridge

There will be next explained mounting of the toner cartridge 6 on the drawer 4.

In mounting the toner cartridge 6 on the drawer 4, the user places the toner cartridge 6 on the drawer 4 in the state in which the drawer 4 is located at the outside position and the drum cartridge 5 is mounted on the drawer 4 as shown in FIG. 4.

When the user places the toner cartridge 6 on the drawer 4 located at the outside position, the guided portion 46A (FIG. 1) of the toner cartridge 6 comes into contact with the guide 26A of the drawer 4. In the state in which the toner cartridge 6 is placed on the drawer 4, the handle 47 of the toner cartridge 6 is located at the first position (FIG. 12A).

The user then slides the toner cartridge 6 toward the housing 2.

In this instance, the guided portion 46A of the toner cartridge 6 is guided by the guide 26A of the drawer 4 and is subsequently guided by the guide 313A of the drum cartridge 5. Thus, the toner cartridge 6 is slid toward the inside of the housing 2.

When the guided portion 46A of the toner cartridge 6 engages the groove 353A of the shutter 35, the shutter 35 becomes movable together with the shutter 45.

The user then moves the handle 47 of the toner cartridge 6 from the first position (FIG. 12A) to the second position (FIG. 12B).

When the handle 47 of the toner cartridge 6 is moved from the first position to the second position, the shutter 45 moves from the closing position to the open position and the shutter 35 moves from the closing position to the open position.

When the handle 47 is located at the second position, the shutter 45 is located at the open position and the shutter 35 is located at the open position as shown in FIG. 2. In this way, mounting of the toner cartridge 6 on the drawer 4 is completed.

In detaching the toner cartridge 6 from the drawer 4, the user moves the handle 47 of the toner cartridge 6 from the second position to the first position in the state in which the drawer 4 is located at the outside position.

When the handle 47 of the toner cartridge 6 is moved from the second position to the first position, the shutter 45 moves from the open position to the closing position and the shutter 35 moves from the open position to the closing position.

The user then withdraws the toner cartridge 6 from the drawer 4 in the first direction.

In this instance, the guided portion 46A is disengaged from the groove 353A of the shutter 35, so that the toner cartridge 6 is detached from the drawer 4.

7. Advantageous Effects (1) The image forming device 1 includes the drawer 4, the drum cartridge 5, and the toner cartridge 6 as shown in FIG.

1. The drum cartridge 5 includes the photoconductive drum 10 and the developer roller 12B. The drum cartridge 5 is mountable on the drawer 4 as shown in FIGS. 3 and 4. The toner cartridge 6 stores the toner and is mountable on the drawer 4 as shown in FIGS. 4 and 2.

In the thus configured image forming device including the drawer 4, (a) the drum cartridge 5 including the photoconductive drum 10 and the developer roller 12B and (b) the toner cartridge 6 storing the toner can be replaced independently of each other.

Thus, each of the drum cartridge 5 and the toner cartridge 6 can be replaced at appropriate timing in accordance with its life.

In the image forming device 1 constructed as described above, the guide 313A of the drum cartridge 5 is connected to the guide 26A of the drawer 4 in the state in which the drum cartridge 5 is mounted on the drawer 4 as shown in FIG. 4.

As shown in FIGS. 4 and 2, this configuration enables the toner cartridge 6 to be guided by the guide 313A of the drum cartridge 5 and the guide 26A of the drawer 4 in mounting the toner cartridge 6 on the drawer 4.

Thus, the toner cartridge 6 can be guided to the drum cartridge 5 utilizing the drawer 4 while achieving size reduction of the drum cartridge 5.

(2) In the image forming device 1, the guide 26A guides the drum cartridge 5 in mounting the drum cartridge 5 on the drawer 4 as shown in FIGS. 3 and 4.

Thus, the drum cartridge 5 can be guided utilizing the guide 26A that guides the toner cartridge 6.

As a result, the drum cartridge 5 can be smoothly mounted on the drawer 4 while preventing the structure of the drawer 4 from becoming complicated.

(3) In the image forming device 1, the drawer 4 includes the guide 27A as shown in FIG. 6. As shown in FIGS. 3 and 4, the guide 27A guides the photoconductive drum 10 in mounting the drum cartridge 5 on the drawer 4.

Thus, the guide 27A of the drawer 4 can guide the photoconductive drum 10 to a specific position with respect to the drawer 4.

(4) In the image forming device 1, at least a part of the guide 313A is located inside the housing 2 as shown in FIG. 4 in the state in which the drum cartridge 5 is mounted on the drawer 4 and the drawer 4 is located at the outside position.

According to this configuration, the toner cartridge 6 can be mounted on the drawer 4 in a state in which the drawer 4 is pulled out of the housing 2 to such an extent that at least a part of the guide 313A is located inside the housing 2.

As a result, this configuration shortens a distance over which the drawer 4 is pulled out, thus reducing a space necessary for replacing the toner cartridge 6.

(5) In the image forming device 1, the photoconductive drum 10 is located inside the housing 2 as shown in FIG. 4 in the state in which the drum cartridge 5 is mounted on the drawer 4 and the drawer 4 is located at the outside position.

This configuration prevents light outside the housing 2 from being incident on the photoconductive drum 10 in the state in which the drawer 4 is located at the outside position.

As a result, the photoconductive drum 10 is protected from being deteriorated due to the light.

Further, the toner cartridge 6 can be mounted on the drawer 4 in a state in which the drawer 4 is pulled out of the housing 2 to such an extent that the photoconductive drum 10 is located inside the housing 2.

As a result, this configuration shortens the distance over which the drawer 4 is pulled out, thus reducing the space necessary for replacing the toner cartridge 6.

(6) In the image forming device 1, the developer housing 12A is located inside the housing 2 as shown in FIG. 4 in the state in which the drum cartridge 5 is mounted on the drawer 4 and the drawer 4 is located at the outside position.

According to this configuration, the toner cartridge 6 can be mounted on the drawer 4 in a state in which the drawer 4 is pulled out of the housing 2 to such an extent that the developer housing 12A is located inside the housing 2.

As a result, this configuration shortens the distance over which the drawer 4 is pulled out, thus reducing the space necessary for replacing the toner cartridge 6.

(7) In the image forming device 1, the guided portion 23A of the drawer 4 is located between the discharge opening 415 and the grip 472 in the first direction as shown in FIG. 2 in the state in which the toner cartridge 6 and the drum cartridge 5 are mounted on the drawer 4 and the drawer 4 is located at the outside position.

According to this configuration, the guided portion 23A can receive a torque caused by the pivotal movement of the handle 47 between the first position (FIG. 12A) and the second position (FIG. 12B).

As a result, this configuration prevents the image forming device 1 from toppling due to the torque, thus enabling the handle 47 to smoothly pivot.

8. Modification

Figure 15:
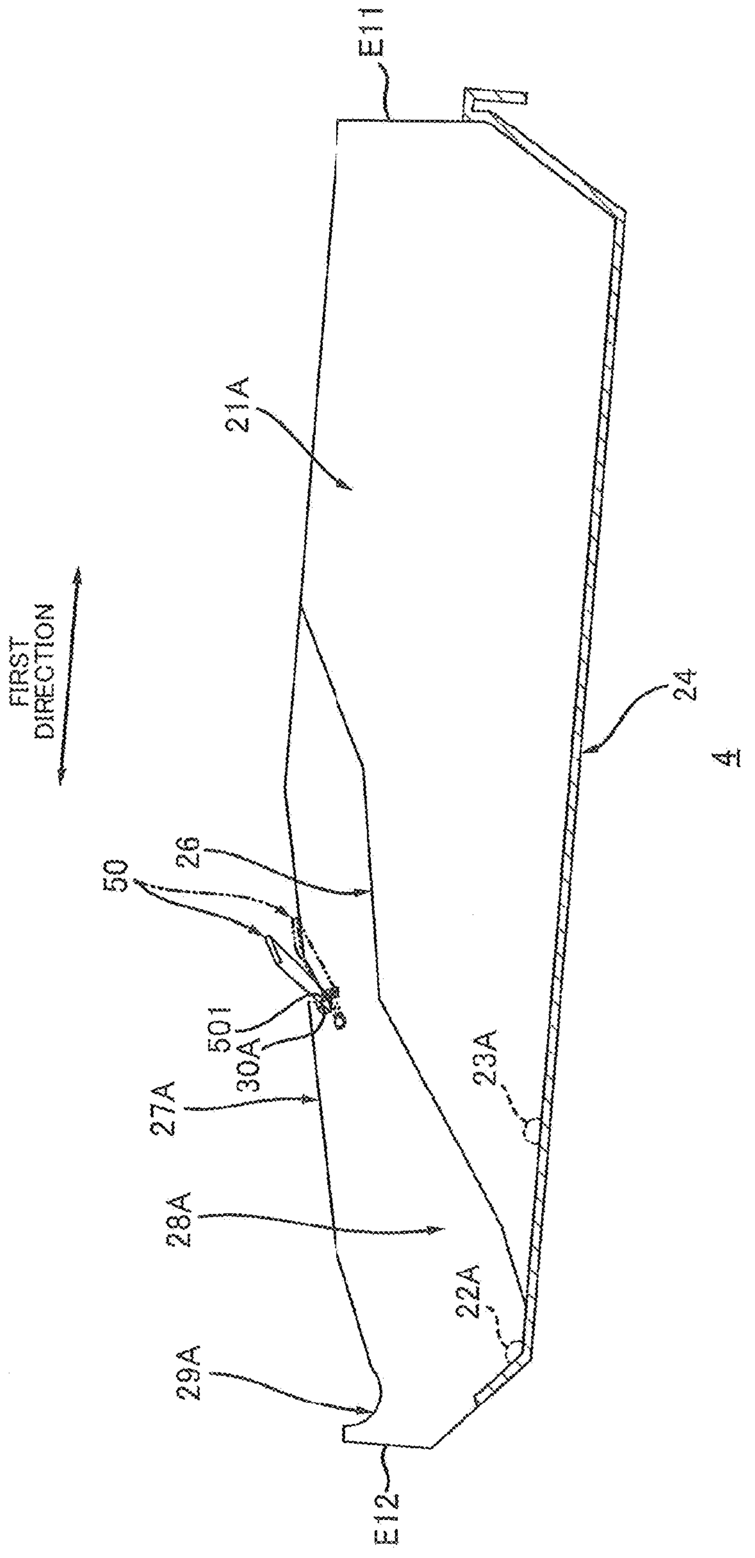
FIG. 15 is an explanatory view for explaining a modification.
Figure 16:
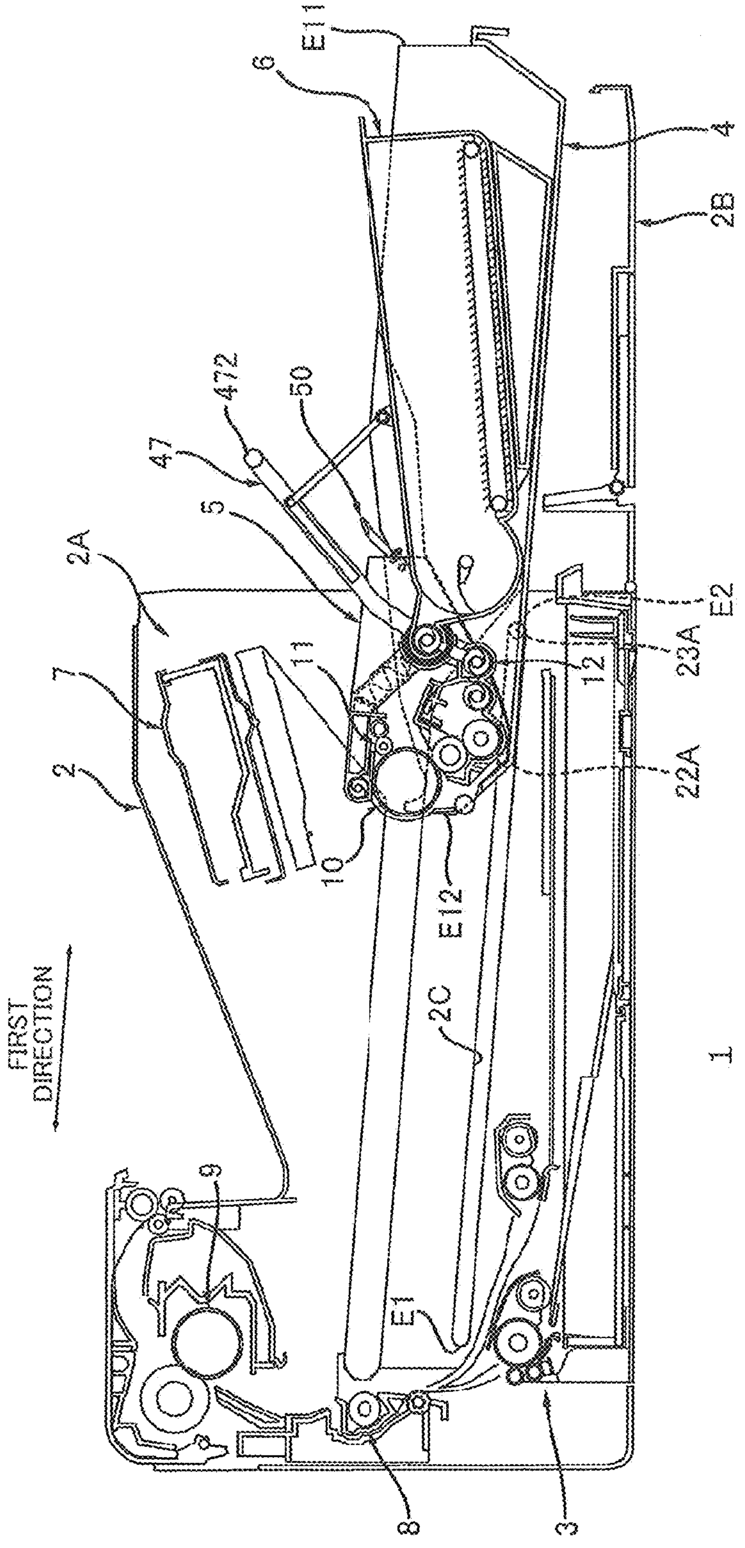
FIG. 16 is an explanatory view for explaining the modification of FIG. 15.

Referring next to FIGS. 15 and 16, there will be explained a modification. The same reference numerals as used in the illustrated embodiment will be used to identify the corresponding components in the modification and explanation thereof is dispensed with.

As shown in FIG. 15, the drawer 4 may include a locking lever 50 in place of the protrusion 301 (FIG. 6) of the locking portion 30A.

The locking lever 50 is attached to the side plate 21A of the drawer 4. The locking lever 50 is movable between a lock position (as indicated by solid line in FIG. 15) and an unlock position (as indicated by virtual line in FIG. 15).

The locking lever 50 includes a protrusion 501 indicated by solid line in FIG. 15. When the locking lever 50 is located at the lock position, the protrusion 501 is located in the locking portion 30A. When the user tries to detach the drum cartridge 5 from the drawer 4 in the state in which the locking lever 50 is located at the lock position, the locking protrusion 33A of the drum cartridge 5 comes into contact with the protrusion 501 of the locking lever 50. Thus, the drum cartridge 5 cannot be detached from the drawer 4 in the state in which the locking lever 50 is located at the lock position. That is, the locking lever 50 locks the drum cartridge 5 with respect to the drawer 4 in the state in which the locking lever 50 is located at the lock position.

On the other hand, the protrusion 501 is not located in the locking portion 30A as indicated by virtual line in FIG. 15 in the state in which the locking lever 50 is located at the unlock position. Thus, when the locking lever 50 is located at the unlock position, the drum cartridge 5 is unlocked from the drawer 4. As a result, the drum cartridge 5 can be detached from the drawer 4 in the state in which the locking lever 50 is located at the unlock position.

As shown in FIG. 16, the grip 472 of the handle 47 is located between the locking lever 50 and the first end portion E11 of the side plate 21A in the first direction in the state in which the toner cartridge 6 and the drum cartridge 5 are mounted on the drawer 4 and the drawer 4 is located at the outside position. In other words, the grip 472 of the handle 47 is located more outward than the locking lever 50.

This configuration easily attracts the user's attention to the grip 472 rather than to the locking lever 50 in the state in which the toner cartridge 6 and the drum cartridge 5 are mounted on the drawer 4 and the drawer 4 is located at the outside position.

As a result, the user can operate the handle 47 prior to operating the locking lever 50 and can detach the toner cartridge 6 from the drawer 4 in the state in which the drum cartridge 5 is locked with respect to the drawer 4.

What is claimed is:

1. An image forming apparatus, comprising:
- a housing having an opening;
- a drum cartridge including a photoconductive drum and a developer roller and mountable on the housing through the opening; and
- a toner cartridge including a toner storage portion storing toner to be supplied to the developer roller and a handle movable between a first position and a second position, the toner cartridge being mountable on the drum cartridge, and
- wherein, in a state in which the toner cartridge is mounted on the drum cartridge and the drum cartridge is mounted on the housing, the handle is located downstream of an upstream end of the toner storage portion of the toner cartridge in a first direction in which the drum cartridge is mounted on the housing.

2. The image forming apparatus according to claim 1, wherein in a state in which the toner cartridge is mounted on the drum cartridge, the drum cartridge is unmountable on the housing when the handle is located at the first position and is mountable on the housing when the handle is located at the second position.

3. The image forming apparatus according to claim 2, wherein the handle is pivotable about an axis that extends in a second direction orthogonal to the first direction and includes a grip that is located at a position nearer to the opening than the axis in the state in which the toner cartridge is mounted on the drum cartridge and the drum cartridge is mounted on the housing.

4. The image forming apparatus according to claim 3, further comprising a drawer movable through the opening between an inside position at which the drawer is located inside the housing and an outside position at which the drawer is located outside the housing,
- wherein the drum cartridge is mountable on the drawer in a state in which the drawer is located at the outside position, and
- wherein the drum cartridge, on which the toner cartridge is mounted, is mounted on the housing by moving the drawer from the outside position to the inside position.

5. The image forming apparatus according to claim 1, wherein the toner cartridge includes:
- a discharge opening through which the toner is discharged; and
- a shutter movable between a closing position at which the shutter closes the discharge opening and an open position at which the shutter opens the discharge opening, and
- wherein the shutter moves in conjunction with the handle.

6. The image forming apparatus according to claim 5, wherein the handle and the shutter are configured such that the shutter is located at the closing position when the handle is located at the first position and the shutter is located at the open position when the handle is located at the second position.

7. The image forming apparatus according to claim 6,
- wherein the drum cartridge includes a guide groove that guides the toner cartridge when the toner cartridge is mounted on the drum cartridge,
- wherein the shutter includes a rib-like protrusion to be guided by the guide groove,
- wherein, in a state in which the handle is located at the first position, a direction in which the protrusion extends coincides with a direction in which the guide groove extends and the toner cartridge is mountable on the drum cartridge, and
- wherein, in a state in which the handle is located at the second position, the direction in which the protrusion extends does not coincide with the direction in which the guide groove extends and the toner cartridge is unmountable on the drum cartridge.

8. The image forming apparatus according to claim 7, further comprising a drawer movable through the opening between an inside position at which the drawer is located inside the housing and an outside position at which the drawer is located outside the housing,
- wherein an inlet opening of the guide groove is located outside the housing when the drawer, on which the drum cartridge is mounted, is located at the outside position.

9. The image forming apparatus according to claim 6,
- wherein the handle is pivotable about a pivot axis that extends in a second direction orthogonal to the first direction, and
- wherein the shutter pivots about the pivot axis of the handle.

10. The image forming apparatus according to claim 1,
- wherein the handle includes a grip,
- wherein the toner cartridge includes a toner storage portion in which the toner is stored,
- wherein, when the handle is located at the first position, the grip is located distant from the toner storage portion, and
- wherein, when the handle is located at the second position, the grip is located so as to extend along the toner storage portion.

* * * * *